(12) United States Patent
Bullis et al.

(10) Patent No.: US 9,595,003 B1
(45) Date of Patent: Mar. 14, 2017

(54) COMPILER WITH MASK NODES

(71) Applicant: Cavium, Inc., San Jose, CA (US)

(72) Inventors: Kenneth A. Bullis, Los Altos, CA (US); Rajan Goyal, Saratoga, CA (US)

(73) Assignee: Cavium, Inc., San Jose, CA (US)

( * ) Notice: Subject to any disclaimer, the term of this patent is extended or adjusted under 35 U.S.C. 154(b) by 132 days.

(21) Appl. No.: 13/896,798

(22) Filed: May 17, 2013

Related U.S. Application Data

(60) Provisional application No. 61/801,179, filed on Mar. 15, 2013.

(51) Int. Cl.
*G06F 17/00* (2006.01)
*G06N 5/02* (2006.01)
*G06N 5/00* (2006.01)

(52) U.S. Cl.
CPC ............. *G06N 5/022* (2013.01); *G06N 5/003* (2013.01); *G06N 5/02* (2013.01)

(58) Field of Classification Search
None
See application file for complete search history.

(56) References Cited

U.S. PATENT DOCUMENTS

| | | |
|---|---|---|
| 5,107,361 A | 4/1992 | Kneidinger et al. |
| 5,463,777 A | 10/1995 | Bialkowski et al. |
| 5,909,699 A | 6/1999 | Sarangdhar et al. |
| 6,233,575 B1 | 5/2001 | Agrawal et al. |
| 6,298,340 B1 | 10/2001 | Calvignac et al. |
| 6,467,019 B1 | 10/2002 | Washburn |
| 6,473,763 B1 | 10/2002 | Corl et al. |
| 6,476,763 B2 | 11/2002 | Allen |
| 6,578,131 B1 | 6/2003 | Larson et al. |
| 6,587,466 B1 | 7/2003 | Bhattacharya et al. |

(Continued)

FOREIGN PATENT DOCUMENTS

| | | |
|---|---|---|
| CN | 1535460 A | 10/2004 |
| CN | 101351784 A | 1/2009 |

(Continued)

OTHER PUBLICATIONS

Theiling, Henrik "Generating Decision Trees for Decoing Binaries" ACM 2001 [Online] DOwnloaded Jul. 14, 2015 http://delivery.acm.org/10.1145/390000/384213/p112-theiling.pdf?ip=151.207.250.51&id=384213&acc=ACTIVE%20SERVICE&key=C15944E53D0ACA63%2E4D4702B0C3E38B35%2E4D4702B0-C3E38B35%2E4D4702B0C3E38B35&CFID=528083660&CFTOKEN=15678279&_acm_=1436903293_abc.*

(Continued)

*Primary Examiner* — Ben Rifkin
(74) *Attorney, Agent, or Firm* — Hamilton, Brook, Smith & Reynolds, P.C.

(57) ABSTRACT

A packet classification system, methods, and corresponding apparatus are provided for enabling packet classification. A processor of a security appliance coupled to a network uses a classifier table having a plurality of rules, the plurality of rules having at least one field, to build a decision tree structure including a plurality of nodes, the plurality of nodes including a subset of the plurality of rules. The plurality of nodes may be stride nodes, mask nodes, or a combination thereof. A mask node may remove restrictions of stride nodes, such as markers and consumption of contiguous bits. As long as a bit of a field is a non-consumed bit, the bit may be used for cutting a field in a mask node. An advantage of a mask node is that the mask node may consume fewer resources (e.g., memory) than a stride node.

30 Claims, 36 Drawing Sheets

(56) References Cited

U.S. PATENT DOCUMENTS

| | | |
|---|---|---|
| 6,735,600 B1 | 5/2004 | Andreev |
| 6,778,530 B1 | 8/2004 | Greene |
| 6,868,414 B2 | 3/2005 | Khanna et al. |
| 6,980,555 B2 | 12/2005 | Mar |
| 7,023,807 B2 | 4/2006 | Michels et al. |
| 7,039,641 B2 | 5/2006 | Woo |
| 7,366,728 B2 | 4/2008 | Corl et al. |
| 7,415,472 B2 | 8/2008 | Testa |
| 7,441,022 B1 | 10/2008 | Schuba et al. |
| 7,509,300 B2 | 3/2009 | Sahni et al. |
| 7,522,581 B2 | 4/2009 | Acharya et al. |
| 7,536,476 B1 | 5/2009 | Alleyne |
| 7,546,234 B1 | 6/2009 | Deb et al. |
| 7,548,944 B2 | 6/2009 | Sahita |
| 7,571,156 B1 | 8/2009 | Gupta et al. |
| 7,937,355 B2 | 5/2011 | Corl et al. |
| 8,005,869 B2 | 8/2011 | Corl et al. |
| 8,156,507 B2 | 4/2012 | Brjazovski et al. |
| 8,447,120 B2 | 5/2013 | Ji et al. |
| 8,477,611 B2 | 7/2013 | Lim |
| 8,856,203 B1 | 10/2014 | Schelp et al. |
| 8,934,488 B2 | 1/2015 | Goyal et al. |
| 8,937,952 B2 | 1/2015 | Goyal et al. |
| 8,937,954 B2 | 1/2015 | Goyal et al. |
| 9,137,340 B2 | 9/2015 | Goyal et al. |
| 9,183,244 B2 | 11/2015 | Bullis et al. |
| 9,191,321 B2 | 11/2015 | Goyal et al. |
| 9,195,939 B1 | 11/2015 | Goyal et al. |
| 9,208,438 B2 | 12/2015 | Goyal et al. |
| 9,430,511 B2 | 8/2016 | Billa et al. |
| 2002/0023089 A1 | 2/2002 | Woo |
| 2002/0124086 A1 | 9/2002 | Mar |
| 2002/0143747 A1 | 10/2002 | Tal et al. |
| 2003/0115403 A1 | 6/2003 | Bouchard et al. |
| 2003/0123459 A1 | 7/2003 | Liao |
| 2003/0135704 A1 | 7/2003 | Martin |
| 2004/0095936 A1 | 5/2004 | O'Neill et al. |
| 2005/0013293 A1 | 1/2005 | Sahita |
| 2005/0240604 A1 | 10/2005 | Corl et al. |
| 2006/0026138 A1 | 2/2006 | Robertson et al. |
| 2006/0098652 A1 | 5/2006 | Singh et al. |
| 2006/0136570 A1 | 6/2006 | Pandya |
| 2006/0155915 A1 | 7/2006 | Pereira |
| 2006/0221967 A1 | 10/2006 | Narayan et al. |
| 2006/0253465 A1* | 11/2006 | Willis ............... G06F 17/2247 |
| 2007/0168377 A1 | 7/2007 | Zabarsky |
| 2008/0031258 A1 | 2/2008 | Acharya et al. |
| 2008/0109392 A1 | 5/2008 | Nandy |
| 2008/0120441 A1 | 5/2008 | Loewenstein |
| 2008/0140631 A1 | 6/2008 | Pandya |
| 2008/0177994 A1 | 7/2008 | Mayer |
| 2008/0310440 A1 | 12/2008 | Chen et al. |
| 2009/0125470 A1 | 5/2009 | Shah et al. |
| 2009/0185568 A1 | 7/2009 | Cho et al. |
| 2009/0274384 A1 | 11/2009 | Jakobovits |
| 2010/0034202 A1 | 2/2010 | Lu et al. |
| 2010/0067535 A1 | 3/2010 | Ma et al. |
| 2010/0110936 A1 | 5/2010 | Bailey et al. |
| 2010/0175124 A1 | 7/2010 | Miranda |
| 2011/0038375 A1 | 2/2011 | Liu et al. |
| 2011/0137930 A1 | 6/2011 | Hao et al. |
| 2011/0167416 A1 | 7/2011 | Sager et al. |
| 2011/0219010 A1 | 9/2011 | Lim |
| 2011/0270889 A1 | 11/2011 | Stevens et al. |
| 2013/0036102 A1 | 2/2013 | Goyal et al. |
| 2013/0039366 A1 | 2/2013 | Goyal et al. |
| 2013/0060727 A1 | 3/2013 | Goyal et al. |
| 2013/0070753 A1 | 3/2013 | Sahni et al. |
| 2013/0085978 A1 | 4/2013 | Goyal et al. |
| 2013/0166886 A1 | 6/2013 | Sasanka et al. |
| 2013/0201831 A1 | 8/2013 | Tal et al. |
| 2013/0218853 A1 | 8/2013 | Bullis et al. |
| 2013/0232104 A1 | 9/2013 | Goyal et al. |
| 2013/0238576 A1 | 9/2013 | Binkert et al. |
| 2013/0282766 A1 | 10/2013 | Goyal et al. |
| 2014/0279850 A1 | 9/2014 | Goyal et al. |
| 2014/0280357 A1 | 9/2014 | Goyal et al. |
| 2014/0281809 A1 | 9/2014 | Goyal et al. |
| 2015/0117461 A1 | 4/2015 | Goyal et al. |
| 2016/0071016 A1 | 3/2016 | Goyal et al. |

FOREIGN PATENT DOCUMENTS

| | | |
|---|---|---|
| CN | 101501637 A | 8/2009 |
| JP | 2002290447 A | 10/2002 |
| WO | WO 2009/145712 A1 | 12/2009 |
| WO | WO 2013/020002 A1 | 2/2013 |
| WO | WO 2013/020003 A1 | 2/2013 |

OTHER PUBLICATIONS

Gupta, P., "Algorithms for Packet Routing Lookups and Packet Classification," Dissertation submitted to the Dept. of Comp. Science of Stanford Univ. (Dec. 2000).

Zhang, B., et al., "On Constructing Efficient Shared Decision Trees for Multiple Packet Filters," Dept. Computer Science Rice University (2010).

Abdelghani, M., et al. "Packet Classification Using Adaptive Rule Cutting," IEEE Proc. of Adv. Indus. Conf. on Telecom. (2005).

Yu, L., et al., "A Novel IP Packet Classification Algorithm Based on Hierarchical Intelligent Cuttings," IEEE 6th Int. Conf. on ITS Telecom. Proceedings 1033-1036 (2006).

http://en.wikipedia.org/Access_control_list, downloaded Feb. 4, 2011.

Baboescu, F., et al., "Packet Classification for Core Routers: Is there an alternative to CAMs?", *Proceedings f the 22$^{nd}$ IEEE Conference on Computer Communications (INFOCOM '03)*, vol. 1, pp. 53-63 (2003).

Baboescu, F. and Varghese, G., "Sealable Packet Classification," *Proceedings of the ACMSIGCOMM '01 Conference on Applications, Technologies, Architectures, and Protocols for Computer Communication (SIGCOMM '01)*, pp. 199-210 (2001).

Gupta, P. and McKeown, N. "Packet Classification on Multiple Fields," *Proceedings of SIGCOMM '99 Conference on Applications, Technologies, Architectures, and Protocols for Computer Communication (SIGCOMM '99)*, pp. 147-160 (1999).

Gupta, P. and McKeown, N. "Classifying Packets With Hierarchical Intelligent Cuttings," *IEEE Micro*, 20(1):34-41 (2000).

Qi, Y., et al., "Packet Classification Algorithms: From Theory to Practice," Proceedings of the 28$^{th}$ IEEE Conference on Computer Communications (INFOCOM '09), pp. 648-656 (2009).

Singh, S., et al., "Packet Classification Using Multidimensional Cutting," *Proceedings of the ACMSIGC0MM '03 Conference on Applications, Technologies, Architectures, and Protocols for Computer Communication (SIGCOMM '03)*, pp. 213-224 (2003).

Fong et al., HaRP: Rapid Packet Classification via Hashing Round-Down Prefixes, *IEEE Transactions on Parallel and Distributed Systems, IEEE Service Center*, v. 22(7), pp. 1105-1119 (2011).

* cited by examiner

| RULE | FIELD-1 (X-RANGE) | FIELD-2 (Y-RANGE) |
|---|---|---|
| R1 | 0 - 31 | 0 - 255 |
| R2 | 0 - 255 | 128 - 131 |
| R3 | 64 - 71 | 128 - 255 |
| R4 | 67 - 67 | 0 - 127 |
| R5 | 64 - 71 | 0 - 15 |
| R6 | 128 - 191 | 4 - 131 |
| R7 | 192 - 192 | 0 - 255 |

FIG. 1

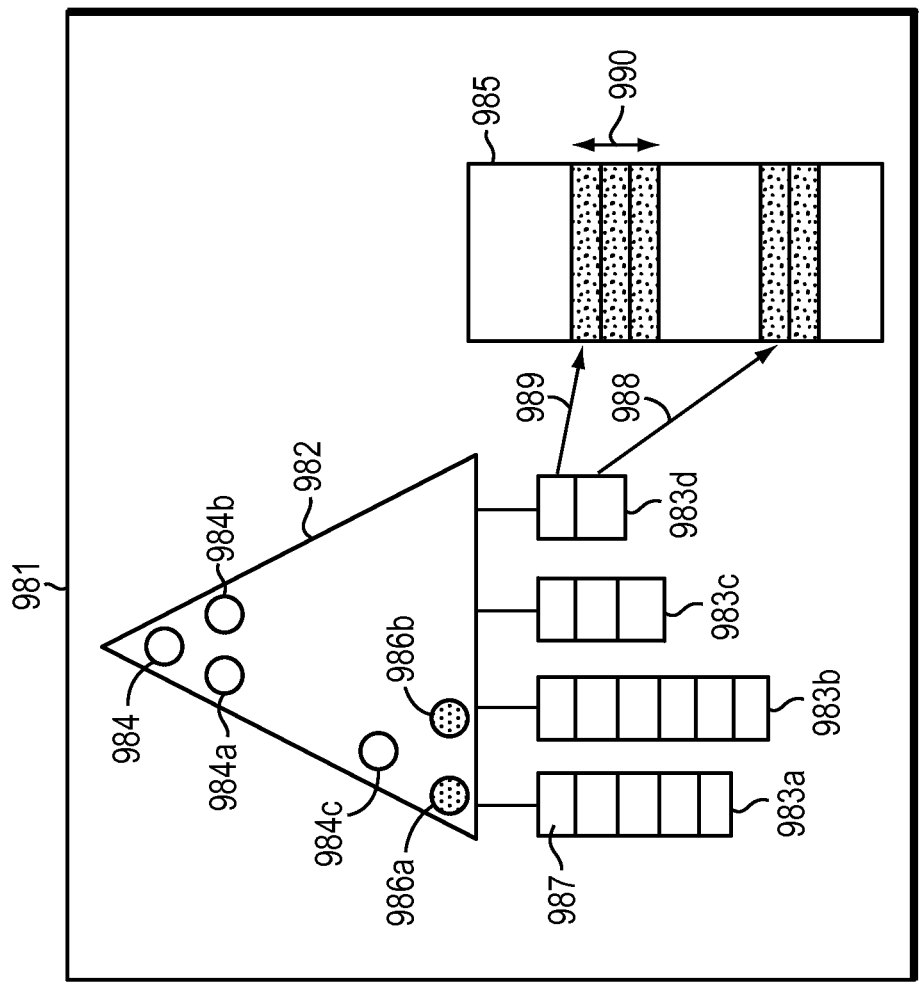
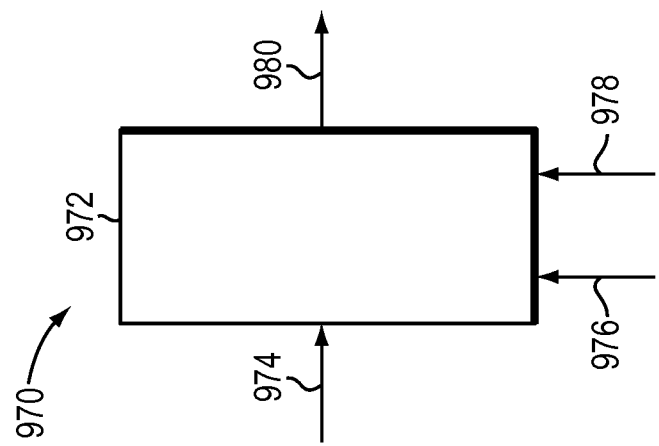

COMPILER WITH MASK NODES

RELATED APPLICATIONS

This application claims the benefit of U.S. Provisional Application No. 61/801,179, filed on Mar. 15, 2013. The entire teachings of the above application are incorporated herein by reference.

BACKGROUND OF THE INVENTION

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY OF THE INVENTION

A system, method, and corresponding apparatus relates to classifying packets.

According to one embodiment, a method may comprise building a decision tree structure including a plurality of nodes using a classifier table having a plurality of rules representing a search space. The plurality of rules may have at least one field, each node may represent a subset of the search space. Building the decision tree structure may include, at each node, dividing the subset of the search space represented by the node into smaller subsets by (i) selecting one or more fields of the at least one field and selecting one or more bits of the selected one or more fields based on a node type and a consumed bit indicator for the node, the consumed bit indicator specifying all bits consumed for search space division by each ancestor of the node, and by (ii) cutting the node into child nodes on the selected one or more bits to create the smaller subsets and allocating the created smaller subsets to the child nodes. The method may include, at each node, updating the consumed bit indicator to specify the selected one or more bits as utilized and associating the updated consumed bit indicator with each of the child nodes. The method may store the built decision tree structure.

Dividing the subset of the search space represented by the node into smaller subsets may include selecting the node type, wherein the node type is selected from a set of node types including at least a mask node type and a stride node type.

Selecting the one or more bits of the selected one or more fields based on the node type and the consumed bit indicator may include, given the selected mask node type, enabling an arbitrary contiguous or non-contiguous selection of the one or more bits from a set of bits including all non-consumed bits for search space subdivision by each ancestor of the node. Given the selected stride node type, selecting the one or more bits of the selected one or more fields based on the node type and the consumed bit indicator may include constraining selection of the one or more bits to one or more contiguous non-consumed bits adjacent to and of lesser significance than a least significant consumed bit specified by the consumed bit indicator.

The consumed bit indicator for the selected mask node type may be a bit mask representing a consumed state for each bit in the selected one or more fields. The consumed bit indicator for the selected stride node type may include a bit location marker indicating a bit location of a most significant non-consumed bit.

The built decision tree structure may include at least one node with the selected mask node type or at least one node with the selected stride node type or a combination thereof.

Given the selected stride node type and a parent node of the node having the mask node type, cutting the node into child nodes on the selected one or more bits may include selecting a first bit of the selected one or more bits. The first bit cut may be adjacent to and of lesser significance than a least significant bit used to cut the parent of the node.

The node may be a parent node and cutting the parent node into child nodes on the selected one or more bits may include, for each child node, creating a node description for the child node based on the selected one or more bits. The node description may be a mask represented as a bitstring including ones, zeroes, or don't care bits, or a combination thereof, in arbitrary bit locations of the mask. The mask may be a one-dimensional or multi-dimensional mask. Cutting the parent node into child nodes on the selected one or more bits may include, for each child node, computing on a bit-by-bit basis an intersection between the node description for the child node and rules represented by the parent node to determine a set of intersecting rules and assigning the set of intersecting rules determined to the child.

Computing the intersection of all rules belonging to the parent node with the node description of the child node may be done on the bit-by-bit basis and may include applying a set of intersection rules including: a don't-care bit intersected with another don't-care bit yields the don't-care bit, a value intersected with an equal value yields the value, the don't-care bit intersected with the value yields the value, and the value intersected with an unequal value yields an empty intersection, and further wherein a given rule of the parent node intersects the child node if the computed intersection for the given rule with the node description of the child node is non-empty.

The method may further include for each child node, determining a redundancy status for each intersecting rule in the determined set of intersecting rules for the child node.

Determining the redundancy status for each intersecting rule for each child node may include comparing each intersecting rule with each rule of higher priority in the determined set using a bit-by-bit basis comparison for each pair of rules compared, wherein (i) if the intersecting rule and the rule of higher priority have differing values for a corresponding bit, the redundancy status for the intersecting rule may be non-redundant, (ii) if the rule of higher priority has a non-don't-care value for a particular bit and the intersecting rule has a don't-care value for the particular bit, the redundancy status for the intersecting rule may be non-redundant, and (iii) if neither (i) nor (ii) apply at any bit, the redundancy status for the intersecting rule may be redundant and the rule of higher priority may be identified as a covering rule for the intersecting rule. The method may further include for each child node, omitting each intersecting rule having the redundant redundancy status and populating a cover list associated with the child node and the covering rule identified for the intersecting rule omitted.

According to another embodiment, a method for walking a decision tree structure may include traversing the decision tree structure for a key, the decision tree structure may include a plurality of nodes having a plurality of rules representing a search space. The plurality of rules may have at least one field, each node representing a subset of the search space. For each node reached during the traversing, the method may include determining a type for the node reached, the type for the node reached may be a stride node type or a mask node type, determining consumed and non-consumed bits of the key, the consumed bits of the key being bits used for search space division of nodes traversed to reach the node reached, selecting one or more bits from the non-consumed bits of the key based on the node type and the consumed bit indicator for the node reached, concatenating the one or more bits selected to form an index, and using the index formed to identify a next node for the traversing.

If the node type is the mask node type, selecting the one or more bits of the selected one or more fields based on the node type may include storing a bitmask for each at least one field of rules represented by the node and selecting the one or more bits from bits marked as non-consumed in the bitmask stored. The one or more bits selected are arbitrary contiguous or non-contiguous non-consumed bits of the key.

If the node type is the stride node type, selecting the one or more bits of the selected one or more fields based on the node type may include storing a stride value for each at least one field of each rule of the node and updating a marker for each at least one field of each rule of the node based on the stride value stored for each at least one field of each rule of the node. The method may further include identifying a least significant consumed bit of the key based on the marker updated and constraining selection of the one or more bits to one or more contiguous bits adjacent to and of lesser significance than the least significant consumed bit identified.

Another example embodiment disclosed herein includes an apparatus corresponding to operations consistent with the method embodiments described above.

Further, yet another example embodiment may include a non-transitory computer-readable medium having stored thereon a sequence of instructions which, when loaded and executed by a processor, causes the processor to complete methods consistent with the method embodiments described above.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 illustrates a classifier table including rules for classifying a packet.

FIG. 9C is a block diagram illustrating an example embodiment of compiling a set of rules into a decision tree data structure.

FIG. 9D illustrates a decision tree data structure including a tree, buckets, and rules.

DETAILED DESCRIPTION OF THE INVENTION

Figure 2:
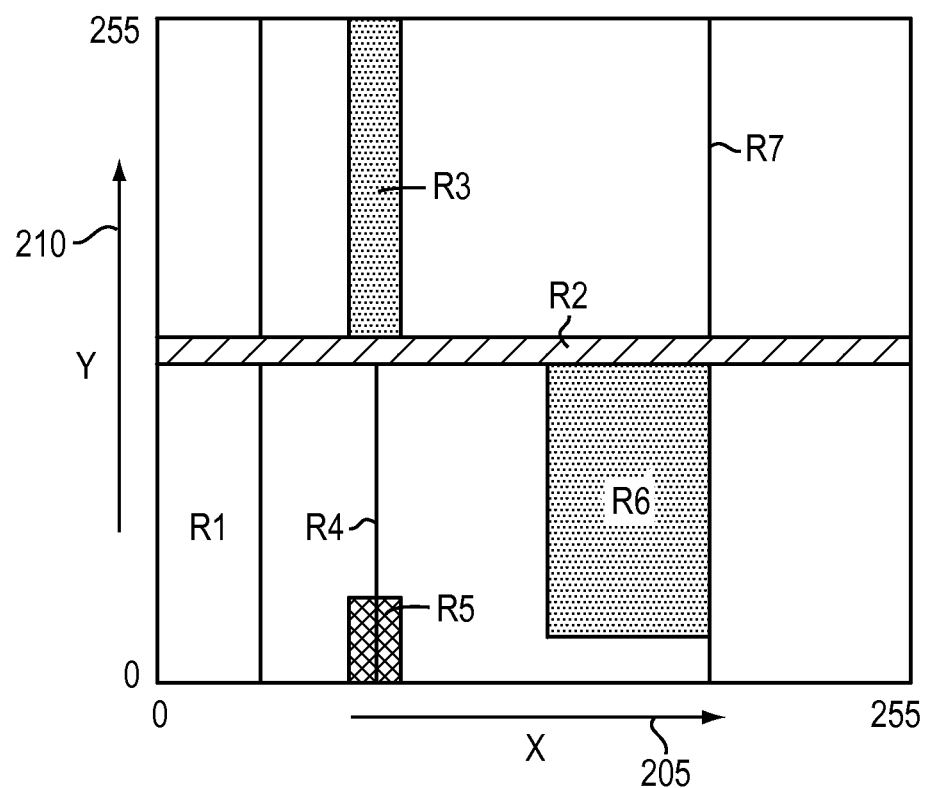
FIG. 2 illustrates a geometric representation of the rules of the classifier table illustrated in FIG. 1.

A description of example embodiments of the invention follows.

The teachings of all patents, published applications and references cited herein are incorporated by reference in their entity.

Although packet classification has been widely studied for a long time, researchers are still motivated to seek novel and efficient packet classification solutions due to: i) the continual growth of network bandwidth, ii) increasing complexity of network applications, and ii) technology innovations of network systems.

Explosion in demand for network bandwidth is generally due to the growth in data traffic. Leading service providers report bandwidths doubling on their backbone networks about every six to nine months. As a consequence, novel packet classification solutions are required to handle the exponentially increasing traffics on both edge and core devices.

Complexity of network applications are increasing due to the increasing number of network applications being implemented in network devices. Packet classification is widely-used for various kinds of applications, such as service-aware routing, intrusion prevention and traffic shaping. Therefore, novel solutions of packet classification must be more intelligent to handle diverse types of rule sets without significant loss of performance.

In addition, new technologies, such as multi-core processors provide unprecedented computing power, as well as highly integrated resources. Thus, novel packet classification solutions must be well suited to advanced hardware and software technologies.

Before describing example embodiments in detail, an example packet classification system and related methods are described immediately below to help the reader understand the inventive features described herein.

Existing packet classification methods trade memory for time. Although the tradeoffs have been constantly improving, the time taken for a reasonable amount of memory is still generally poor. Because of problems with existing methods, vendors use ternary content-addressable memory (TCAM), which uses brute-force parallel hardware to simultaneously check packets against all rules. The main advantages of TCAMs over existing methods are speed and determinism (TCAMs work for all databases).

A TCAM is a hardware device that functions as a fully associative memory. A TCAM cell stores three values: 0, 1, or 'X,' which represents a don't-care bit and operates as a per-cell mask enabling the TCAM to match rules containing wildcards (e.g., don't care bits). In operation, a whole packet header can be presented to a TCAM to determine which entry (rule) it matches. However, the complexity of TCAMs has permitted only small, inflexible, and relatively slow implementations that consume a lot of power. Therefore, a need continues for efficient methods operating on specialized data structures.

Current methods remain in the stages of mathematical analysis and/or software simulation (observation based solutions). Proposed mathematic solutions have been reported to have excellent time/spatial complexity. However, methods of this kind have not been found to have any implementation in real-life network devices because mathematical solutions often add special conditions to simplify a problem and/or omit large constant factors which might conceal an explicit worst-case bound.

Proposed observation based solutions employ statistical characteristics observed in rules to achieve efficient solution for real-life applications. However, these observation based methods generally only work well with specific types of rule sets. Because packet classification rules for difference applications have diverse features, few observation based methods are able to fully exploit redundancy in different types of rule sets to obtain stable performance under various conditions.

Packet classification is performed using a packet classifier, also called a policy database, flow classifier, or simply a classifier. A classifier is a collection of rules or policies. Packets received are matched with rules, which determine actions to take with a matched packet. Generic packet classification requires a router to classify a packet on the basis of multiple fields in a header of the packet. Each rule of the classifier specifies a class that a packet may belong to, according to criteria on 'F' fields of the packet header, and associates an identifier (e.g., class ID) with each class. For example, each rule in a flow classifier is a flow specification, in which each flow is in a separate class. The identifier uniquely specifies an action associated with each rule. Each rule has 'F' fields. An ith field of a rule R, referred to as R[i], is a regular expression on the ith field of the packet header. A packet P matches a particular rule R if for every i, the ith field of the header of P satisfies the regular expression R[i].

Classes specified by the rules may overlap. For instance, one packet may match several rules. In this case, when several rules overlap, an order in which the rules appear in the classifier may determine the rule's relative priority. In other words, a packet that matched multiple rules belongs to the class identified by the identifier (class ID) of the rule among them that appears first in the classifier. Alternatively, a unique priority associated with a rule may determine its priority, for example, the rule with the highest priority.

Packet classifiers may analyze and categorize rules in a classifier table and create a decision tree that is used to match received packets with rules from the classifier table. A decision tree is a decision support tool that uses a tree-like graph or model of decisions and their possible consequences, including chance event outcomes, resource costs, and utility. Decision trees are commonly used in operations research, specifically in decision analysis, to help identify a strategy most likely to reach a goal. Another use of decision trees is as a descriptive means for calculating conditional probabilities. Embodiments described herein utilize decision trees to selectively match a received packet with a rule in a classifier table to determine how to process the received packet.

A decision tree of rules, or tree, represents a set of rules. The decision tree may also be called a Rule Compiled Data Structure (RCDS) or a performance tree. The tree is a binary data structure having nodes and leaves. Each leaf of the tree points to a subset of the rules, called a bucket of rules, or bucket. Each of the buckets represents a subset of the rules. Each bucket is a data structure (e.g., an array) containing pointers to rules, which are stored in a rule table. Rules (or pointers to rules) within a bucket are ordered by priority (e.g., in increasing or decreasing priority). A rule table is a data structure (e.g., an array) containing the rules. Rules within the rule table may be ordered or unordered.

FIG. 1 illustrates a classifier table 100 including rules for classifying a packet. As illustrated, the classifier table contains seven rules (R1-R7), each containing two fields, Field-1 110, and Field-2 115. Although the table illustrates rules being 2-tuple (e.g., containing only two fields), it should be noted that rules may contain an n number of fields and be n-tuple. Each rule specifies a range of values (e.g., Internet Protocol (IP) addresses or Layer 4 ports or protocols) in each dimension (field). For example, Field-1 may be represented in the x-dimension of an x/y graph, while Field-2 may be represented in the y-dimension of an x/y graph.

FIG. 2 illustrates a geometric representation of the rules of the classifier table 100. The rules range from values 0-255 in both the x-dimension 205 and y-dimension 210. As illustrated, each dimension of the graph is subdivided based on the ranges of each field of each rule from classifier table 100.

Figure 3A:
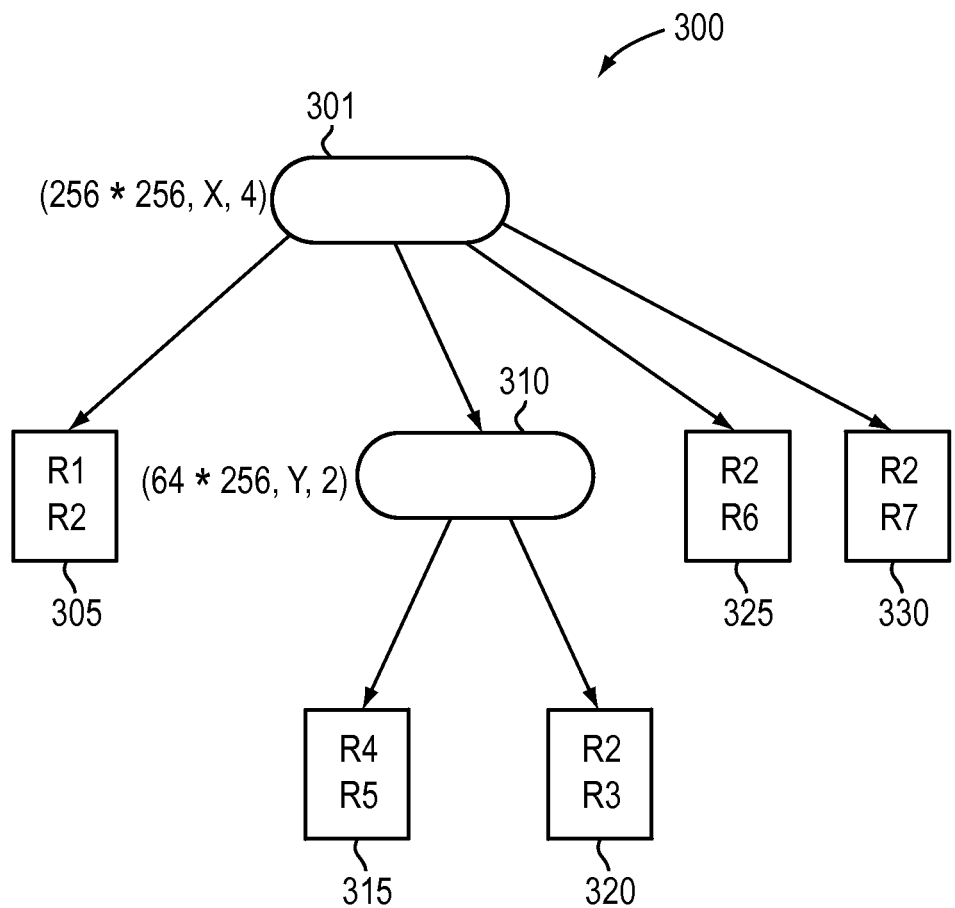
FIG. 3A illustrates a decision tree data structure compiled from the classifier table illustrated in FIG. 1.

FIG. 3A illustrates a decision tree data structure 300 compiled from the classifier table 100. The decision tree 300 contains a set of elements called nodes (301, 305, 310, 315, 320, 325, 330) that are empty or satisfy one of the following conditions: i) there is a distinguished node r, called the root node, and ii) the remaining nodes are divided into disjoint subsets, each of which is a sub-tree. As illustrated, node 301 is the root node of the decision tree and a parent node of nodes 305, 310, 325, and 330, which are considered child nodes of root node 301. The degree of a node is the number of nonempty sub-trees the node contains. A node with degree zero is considered a leaf node. Thus, nodes 305, 315, 320, 325, and 330 are considered leafnodes. Nodes with a positive degree are internal nodes (e.g., node 310).

Each node of the decision tree 300 contains a subset of rules of a classifier table. As stated above, each rule has 'F' fields and an ith field of a rule R, referred to as R[i], is a regular expression on the ith field of a received packet header. A packet P matches a particular rule R if for every i, the ith field of the header of P satisfies the regular expression R[i]. Thus, when a packet is received, a decision tree is walked (e.g., by a runtime walker) to determine a matching rule, which is used to determine an action to take with the received packet.

For example, if a packet is received that contains headers matching rule R7 (see FIG. 1), decision tree 300 is walked (e.g., traversed) to find matching rule R7. Thus, the packet is first passed through root node 301, which contains all rules of the packet classification table, which has been cut into four children. Cutting a node refers to subdividing the node into n number of child nodes. The n number of child nodes created corresponds to the number of cuts (subdivisions) of the node that are made. In this example, the rules in root node 301 have been subdivided into four rule lists (e.g., corresponding to each child node 305, 310, 325, and 330). Thus, it is determined that the packet should be passed to child node 330 that contains a subset of rules having fields within a range of each header of the received packet. After the packet is passed to node 330, the packet is matched with rule R7.

Example embodiments described herein build a decision tree data structure by carefully preprocessing a classifier. Each time a packet arrives, the runtime walker traverses the decision tree to find a leaf node that stores a small number of rules. Once the leaf node is reached, a linear search of the rules within the leaf node occurs to find a matching rule.

During building of the decision tree, embodiments described herein determine the shape and depth of the decision tree.

Figure 3B:
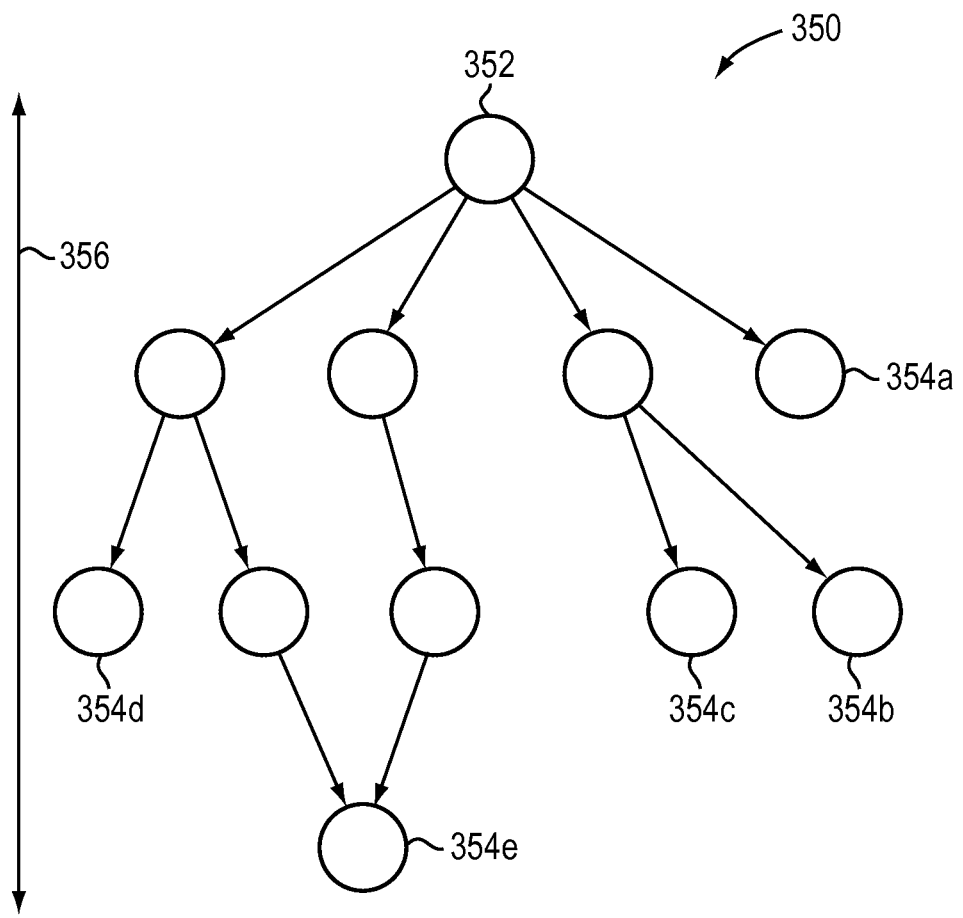
FIG. 3B illustrates depth of a decision tree data structure.

FIG. 3B illustrates a decision tree data structure 350 that includes a root node 352, and leaf nodes 354a-e, and has a depth 356.

Figure 3C:
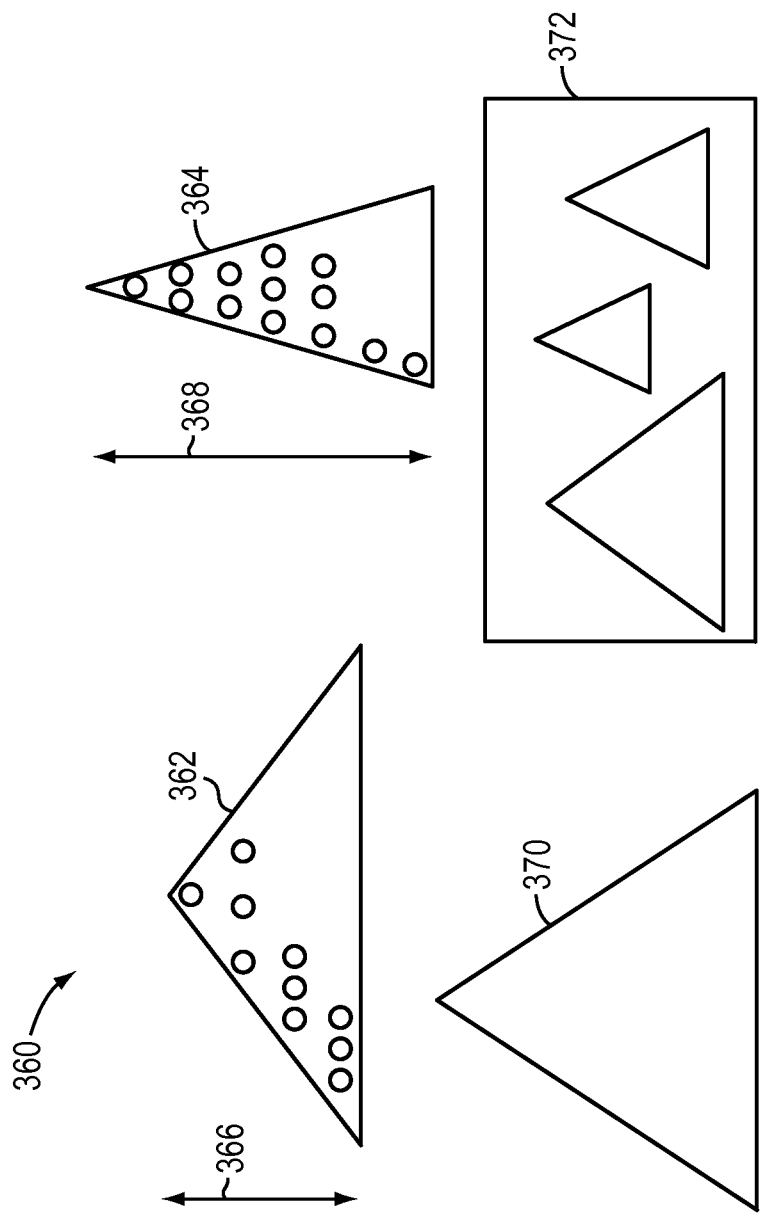
FIG. 3C illustrates depth and shape of decision tree data structures.

FIG. 3C illustrates depth and shape of decision tree data structures (360). For example tree data structure 362 has a depth 366 that is shallow in comparison to the depth 368 of decision tree data structure 364. The number of subtrees in the decision tree data structure may alter the shape of the decision tree data structure, for example a single subtree 370 versus a group of subtrees 372.

In addition, embodiments described herein determine which field to cut at a node of the decision tree and the number of cuts to make on the field to create child nodes based on the field cut and the number of cuts made on the field.

Figure 4:
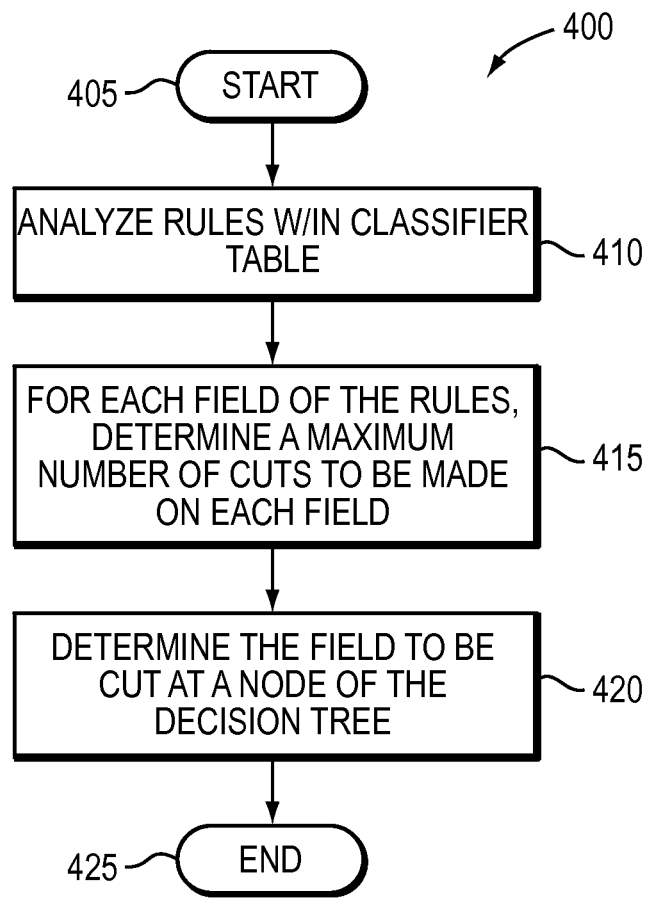
FIG. 4 is a flow diagram of a method for building a decision tree.

FIG. 4 is a flow diagram of a method 400 for building a decision tree. The method begins (405). The method analyzes a classifier table including rules for classifying a packet (410). As stated above, each rule in the classifier table has 'F' fields. The method analyzes the classifier table to determine a number of rules and a number of fields associated with each rule. Based on the analysis, at 415, the method determines a maximum number of cuts that can be made on each field 'F' of the rules. For example, a maximum number of cuts may be based on a given storage capacity. The method, for each node of the decision tree, may determine the field 'F' on which to cut the node to create child nodes (420), then the method ends (425). Determining the number of cuts that can be made on each field 'F' may balance efficiency and memory requirements. A large number of cuts on a field may decrease a decision tree's depth, accelerating query time; however, too large a number of cuts increases storage demand.

Figure 5:
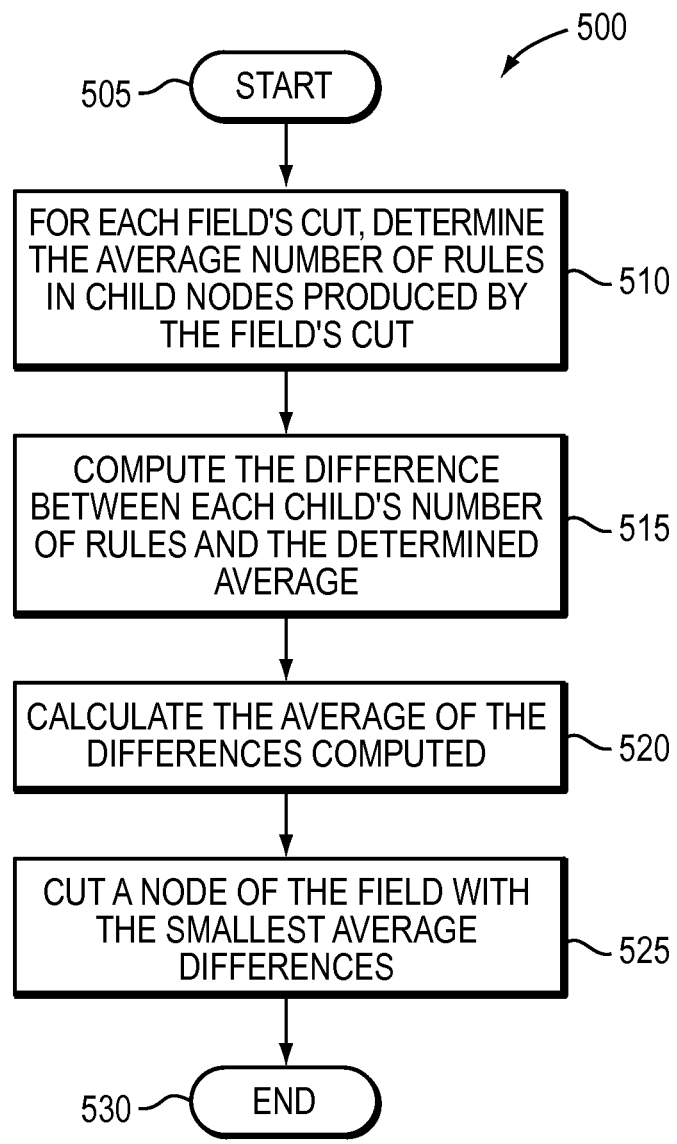
FIG. 5 is a flow diagram of a method for determining a field on which to cut a node.

FIG. 5 illustrates a flow diagram of a method 500 for determining a field on which to cut a node. By computing, for each field's cut, an average number of rules in the children produced by that cut, the difference between each child's actual number of rules and the average may be computed, and those differences may then be averaged, such that the field with the smallest such difference average may be selected. A tree that is shallower on average may be built, resulting in a shorter search time.

The method begins (505) and, based on the determined number of cuts to be made on each field (415 of method 400), determines an average number of rules in child nodes produced by cutting each field (510). The method computes a difference between an actual number of rules in each child node number of rules and the determined average number of rules in each child node (515). The method computes the average of the differences computed (520). The method cuts a node of the decision tree on the field with the smallest average difference (525).

Methods 400 and 500 are iterated on each node of the decision tree, until leaf nodes are created having no more than a given number of rules. The given number is adjustable. Methods 400 and 500 begin building a decision tree by starting with a root node that represents a complete rule list. Using method 400, a determination is made as to the number of cuts to be made on each dimension (field).

Once a determination is made as to the number of cuts to be made on each dimension, method 500 is used to determine which dimension to cut the root node of the decision tree. The cut on the root node causes child nodes to be created. Methods 400 and 500 are repeated on each child node until the only nodes remaining are leaf nodes (e.g., a node where no additional cuts can be made based on the number of rules in the child node and a given adjustable threshold number of rules for the child node). In other words, local decisions are taken at each node which results in the overall decision tree.

Figure 6:
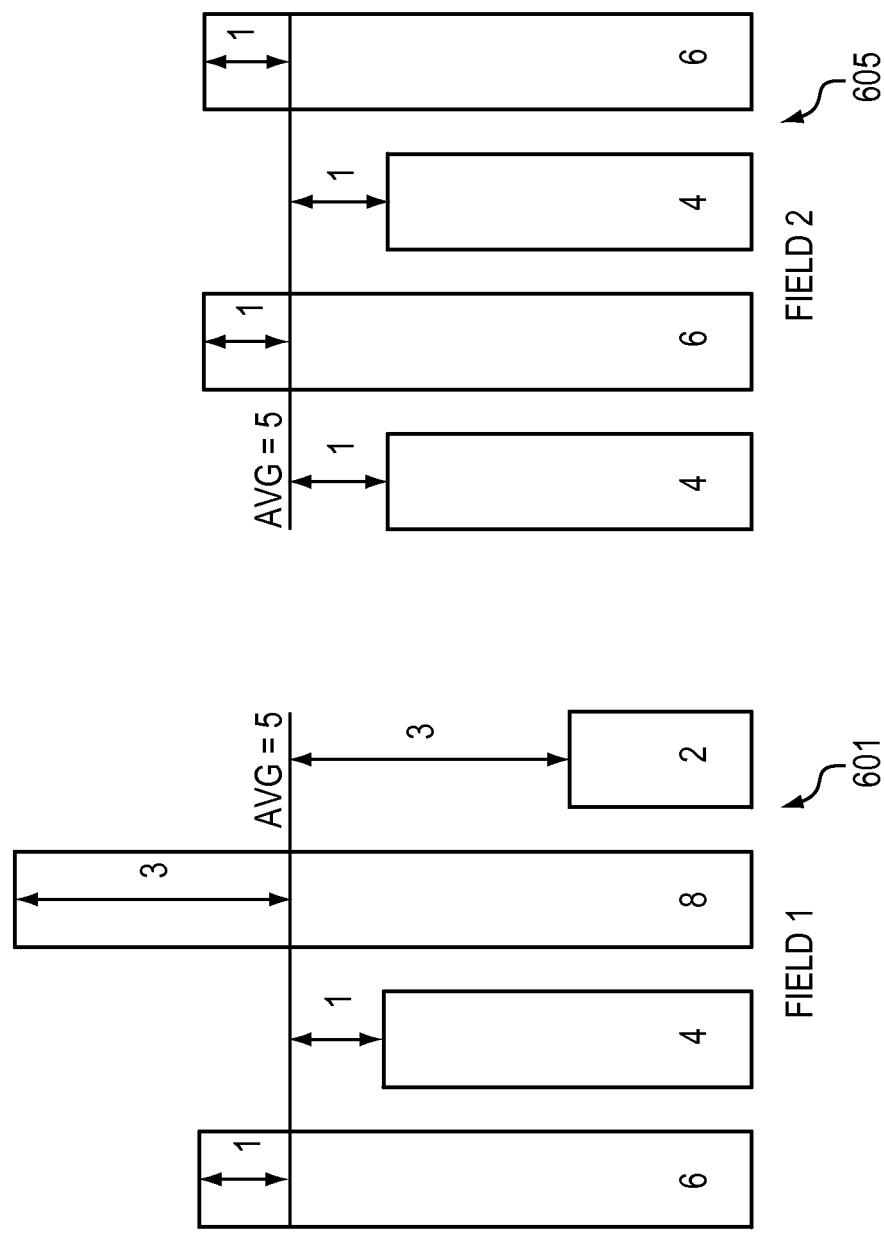
FIG. 6 is a diagram illustrating cuts made to fields of rules in a classification table.

FIG. 6 is a diagram illustrating cuts made to fields of rules in a classification table. Field-1 601 of a classifier table has been cut into 4 children, with each child containing 6, 4, 8, and 2 rules respectively. Field-2 605 of a classifier table has also been cut into 4 children containing 4, 6, 4, and 6 rules respectively. Referring to 510 of method 500, an average number of rules in child nodes by cutting each field are determined. As illustrated in FIG. 6, the average number of rules in both Field-1 and Field-2 per child node is 5 rules. Further, FIG. 6 illustrates the computed difference between the actual number of rules in each child node and the average difference, corresponding to 515 of method 500. The average of the calculated differences is then computed. For Field-1 601 the average difference is 2, while the average difference for Field-2 605 is 1. Thus, referring to 525 of method 500, a node is cut on Field-2 605 because the average difference is less than the average difference calculated for Field-1.

Once a cut for a node has been chosen, embodiments described herein determine whether to merge cuts made by a node's children. Merging entails grouping a parent node and the parent node's children into a single node. For example, if child nodes are cut on fields different than the parent node, the result would be a parent node that cuts on multiple fields.

In addition, child nodes that cut on the same field as the parent node may also be merged with the parent node by relaxing a space limit. The node resulting from the merge may have up to the absolute maximum number of children; for example, it is not constrained by a heuristic such as a maximum-space formula.

For example, a rule set (e.g., classifier table) may contain rules with 3 tuples or fields, F1, F2 and F3. In this example, a root node (N0) may cut on F1 and a number of cuts may be four. For example, 2 bits of F1 may be taken to decide a cut identifier. The result may be that the root node has 4 children, for example, N1, N2, N3 and N4. If N1 is cut on F1 and has 4 cuts, for example, 2 bits of F1 are taken to decide the cut identifier, N1 would have 4 children, for example, N11, N12, N13, N14. If N2 is cut on F2 and has 4 cuts, for example, 2 bits of F2 are taken to decide a cut identifier, N2 will have 4 children, for example, N21, N22, N23, N24. If N3 is cut on F1 and has 4 cuts, for example 2 bits of F1 are taken to decide the cut identifier, N3 will have 4 children, for example N31, N32, N33, N34. If N4 is cut on F3 and has 4 cuts, for example 2 bits of F3 are taken to decide the cut identifier; N4 would have 4 children, for example, N41, N42, N43, N44. The example describes that N0 may be cut on 3 fields, for example F1, F2 and F3 and the total cuts would be 256. The 4 bits of F1, 2 bits of F2 and 2 bits of F3 may be combined as 8 bits to cut N0, resulting in 256 children. A lesser number of levels is provided as there are only 2 levels as compared to the earlier 3 levels. The layer of N1, N2, N3, N4 has been removed, and the root node N0 and has its 256 children. A result in this example is that a total number of nodes in the tree is 257, as compared to 21 in original tree before merging. A balance is made between storage and performance tradeoff. For example, levels of the tree may be reduced at the expense of more nodes in tree.

Figure 7:
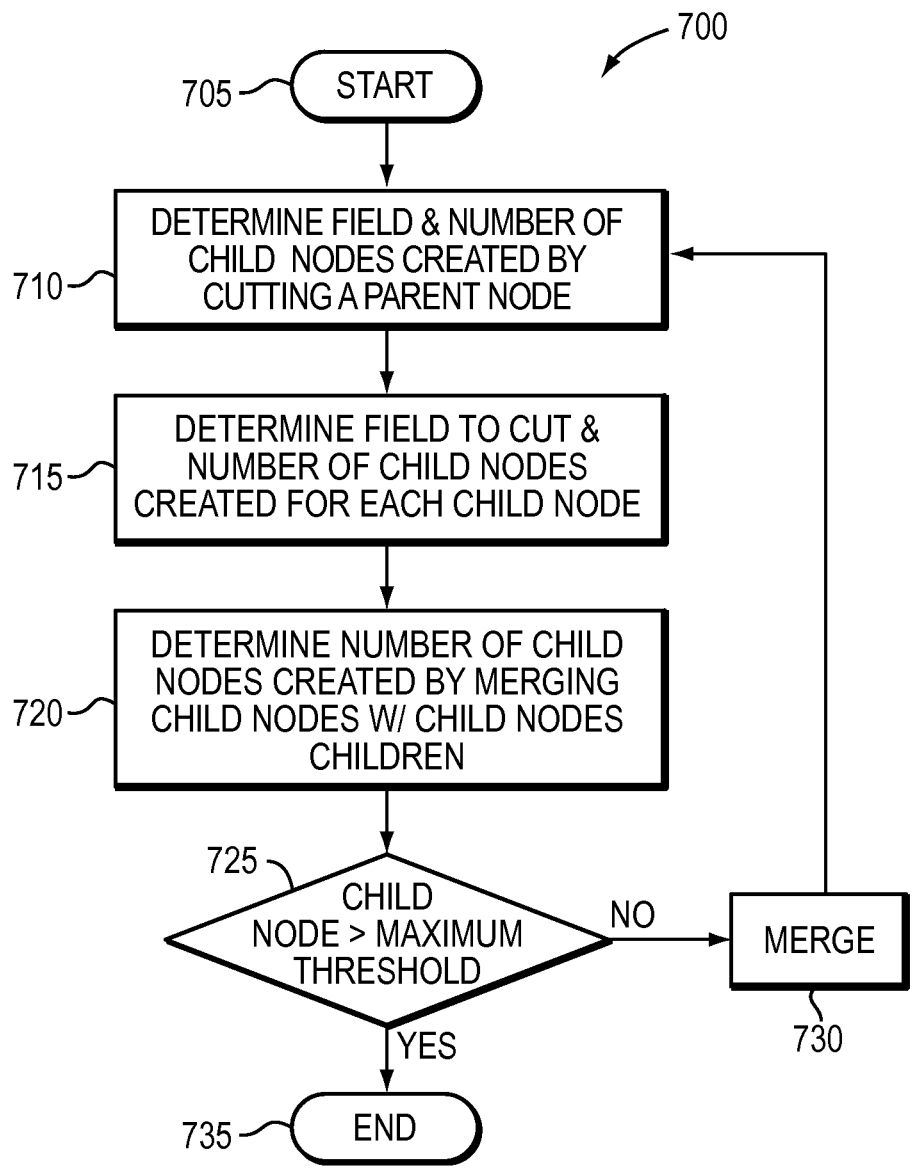
FIG. 7 is a flow diagram of a method for merging nodes of a decision tree.

FIG. 7 is a flow diagram of a method 700 for merging nodes of a decision tree. The method begins (705) and determines the field and number of child nodes to be created for the original node (e.g., a parent node) (710). The method makes a similar determination for each of the child nodes (715). The method determines the number of child nodes that results from a merge (720). The method determines if the resulting number of child nodes is within a predetermined maximum number of child nodes (725). If not, the method ends (735). If so, the method merges the nodes (730). Method 700 iterates for new sets of child nodes until merging is no longer possible. The predetermined maximum may be adjusted at each iteration. As a result, trees may be built that are wider and shallower, resulting in shorter search times.

Figure 8A:
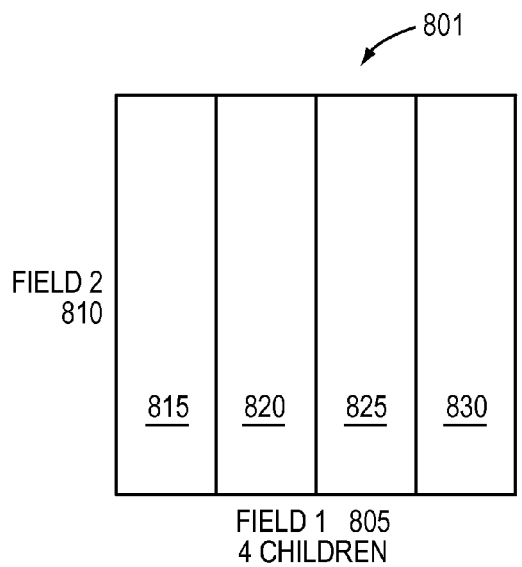
FIG. 8A-C shows a graphical example of merging nodes.
Figure 8B:
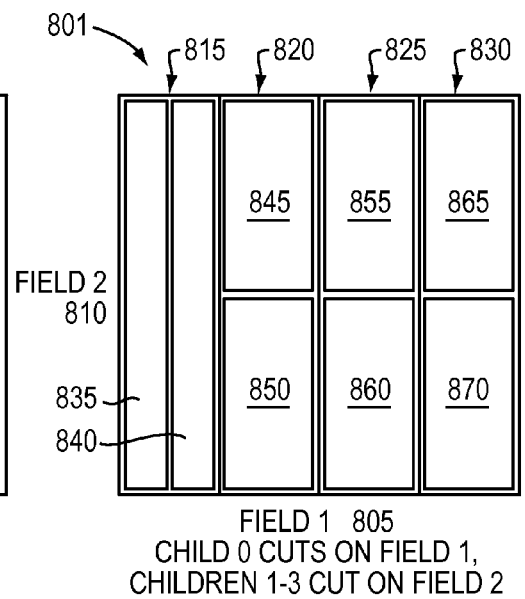
Figure 8C:
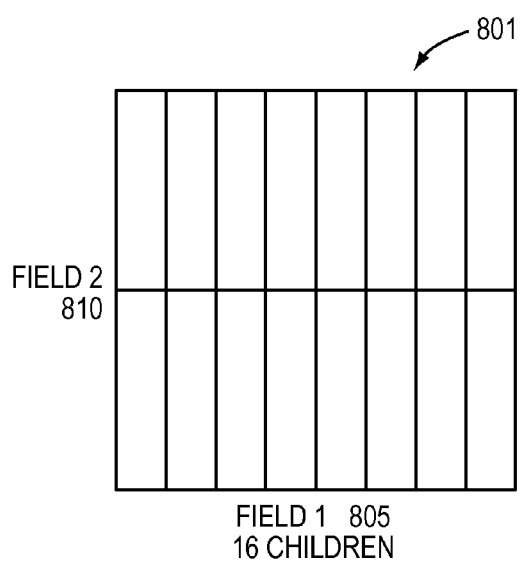

FIG. 8A-C shows a graphical example of merging nodes. FIG. 8A is a graphical example of cuts made on fields of rules in a classifier table on a single node 801. For example, FIG. 8A illustrates a single node 801 that has rules having only two fields Field-1 805 and Field-2 810. Node 801 has been subdivided (e.g., cut) into four child nodes 815, 820, 825, and 830, as represented by the subdivisions of Field-1 805.

FIG. 8B illustrates the cuts made on the child nodes 815, 820, 825, 830 of node 801. For example, child node 815 has been cut on Field-1 805 creating child nodes 835 and 840. Child nodes 820, 825, and 830 have been cut on Field-2 810 creating child nodes 845-870.

FIG. 8C illustrates the merging of child nodes 815-830 and 835-870. As illustrated, root node 801 is now cut on both Field-1 805 and Field-2 810 creating 16 child nodes.

Sometimes, even when a node is cut into the maximum number of children, only one child has any rules, because all the node's rules are clustered into one small area of a search space.

Figure 9A:
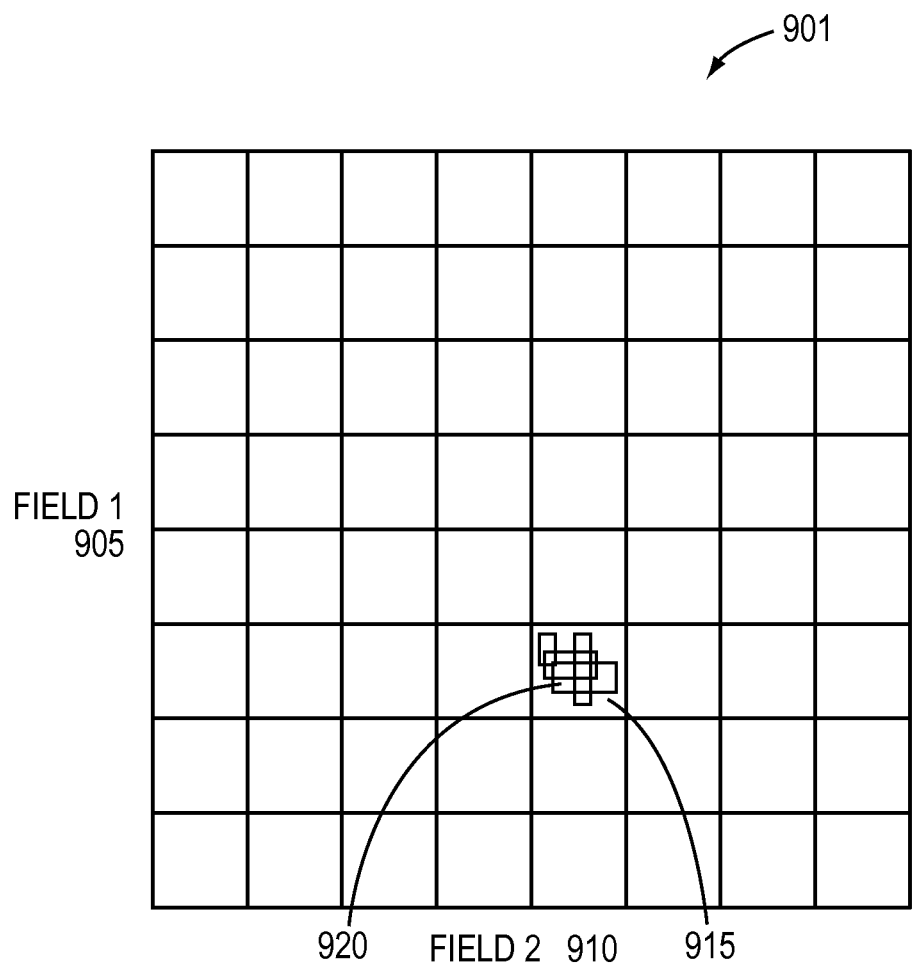
FIG. 9A shows a graphical example of a node cut resulting in a child node having all the rules of a classifier table.

FIG. 9A shows a graphical example of a node 901 that has been cut resulting in a child node 915 having all the rules 920 of a classifier table. Even after cutting both Field-1 905 and Field-2 910 by a factor of 8, into a total of 64 children, all of the node's original rules are inherited by a single child node 915. A runtime walker may be used to traverse a received packet through the decision tree data structure to obtain a matching rule. In this case, the runtime walker may have to spend time traversing this node, but does not achieve any subdivision of the search space. A key, such as data extracted from header tuples of the packet, may be used by the runtime walker for matching against rules. In this case, the only thing the runtime walker achieves is consuming the next few bits of the key in order to get down to the bits that can be used to choose among the rules. Embodiments herein may store, at each node, a number of bits a runtime walker should skip over as well as the number (identifier) of the field whose bits are to be skipped, when the walker traverses the node. As a result, the number of tree nodes that a runtime walker must traverse may be reduced, resulting in shorter search times.

Embodiments described herein include at least three data structures that include: i) a tree, ii) buckets, and ii) a rule table. A tree includes nodes and leaf nodes. Leaf nodes may be linked to buckets. The leaf nodes may point to buckets, buckets may contain a set of rules. Embodiments described herein may store rules in common tables and the buckets pointed to by leaf nodes may contain rule numbers corresponding to the rules in the rules table. Buckets may include rules in any suitable manner as may be known to one skilled in the art. Each bucket may be a data structure that may include one or more bucket entries. A bucket entry may be a rule, an index to a rule, a pointer to a rule, a pointer to a set of rules, or a pointer to another bucket. A bucket may include a linked list to the rules. A bucket may include entries including any combination thereof. For example, a bucket may have one entry that is a pointer to a rule and one entry that is a pointer to a set of rules, etc. Rule priority may be stored with a rule or linked to a rule in any suitable manner.

Figure 9B:
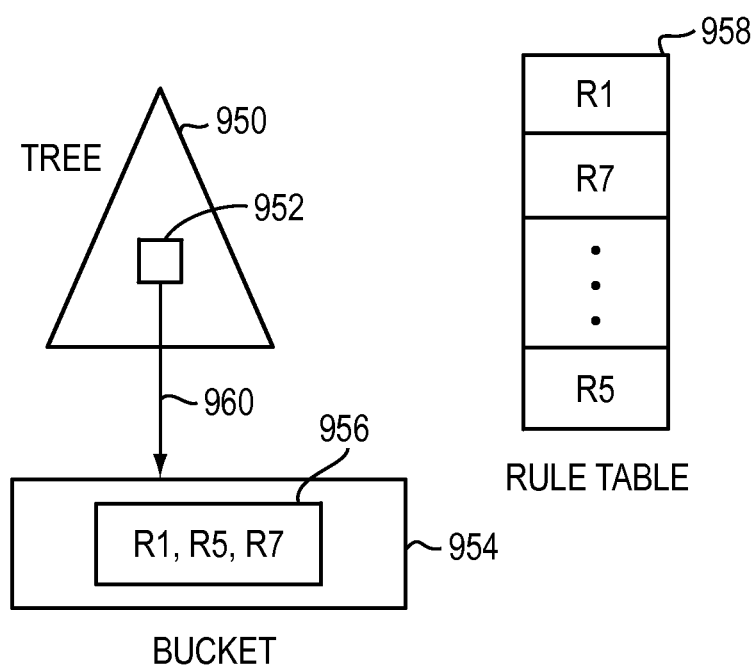
FIG. 9B is an illustration of a tree, a leaf node pointing to a bucket containing a set of rules of a classifier rule table.

FIG. 9B is an illustration of an example embodiment of a tree 950, a leaf node 952 pointing to (960) a bucket 954 containing a set of rules 956 of a classifier rule table 958.

FIG. 9C is a block diagram 970 illustrating an example embodiment of compiling a set of rules into a decision tree data structure. A software compiler 972 may receive a rule set 974, a maximum tree depth 976 and a number of subtrees 978. The software compiler 972 may generate a set of compiled rules 980.

FIG. 9D illustrates a decision tree data structure 981 including a tree, buckets, and rules. The set of compiled rules 980 may generate a decision tree data structure 981 including a tree 982, buckets 983*a-d*, and rules 985. The tree 982 may include a root node 984, nodes 984*a-c*, and leaf nodes 986*a-b*. Each leaf node 986 of the tree 982 points to a bucket 983. Each bucket may include one or more bucket entries 987. A leaf node may include bucket information that may be used to locate the bucket entries or a bucket list of entries. A bucket entry may be a pointer to rule (988), or a pointer (989) to a set of rules (990). The set of rules 990 may be a sequential group of rules, or a group of rules scattered throughout the memory, either organized by a plurality of pointers or by a method used to recollect the set of rules. The set of rules 990 may also be called a chunk, or a chunk of rules. A bucket entry that points to the set of rules 990 may be called a chunk pointer.

Embodiments described herein identify i) bucket duplication, ii) rule duplication, iii) node duplication, and iv) priority duplication. Once a decision tree is built, it may be determined that some leaf nodes point to buckets containing the same rules (e.g., duplicate rules) or some may point to buckets containing a partial duplicate. Embodiments described herein identify duplication of data and determine how to reuse or share the duplicated data so that there is only a single instance of the duplicated data.

Embodiments described herein may remove duplicate buckets keeping only a single copy. For example, in some scenarios different leaf nodes may have buckets that contain the same rules. In such a situation, a single bucket is stored and all the leaf nodes point to the same bucket. Thus, the memory required to hold a given tree may be reduced.

In some scenarios, when a parent node is cut to generate child nodes, some of the child nodes inherit the same rule sets. This is called node duplication. For example, if a parent node has 100 rules starting from rule R1 to rule R100 and the parent node is cut into 64 children, several of the 64 child nodes may inherit the same rules. Embodiments described herein may identify the child nodes that contain the same rule set, and only process one of the nodes having the same rules.

Figure 10A:
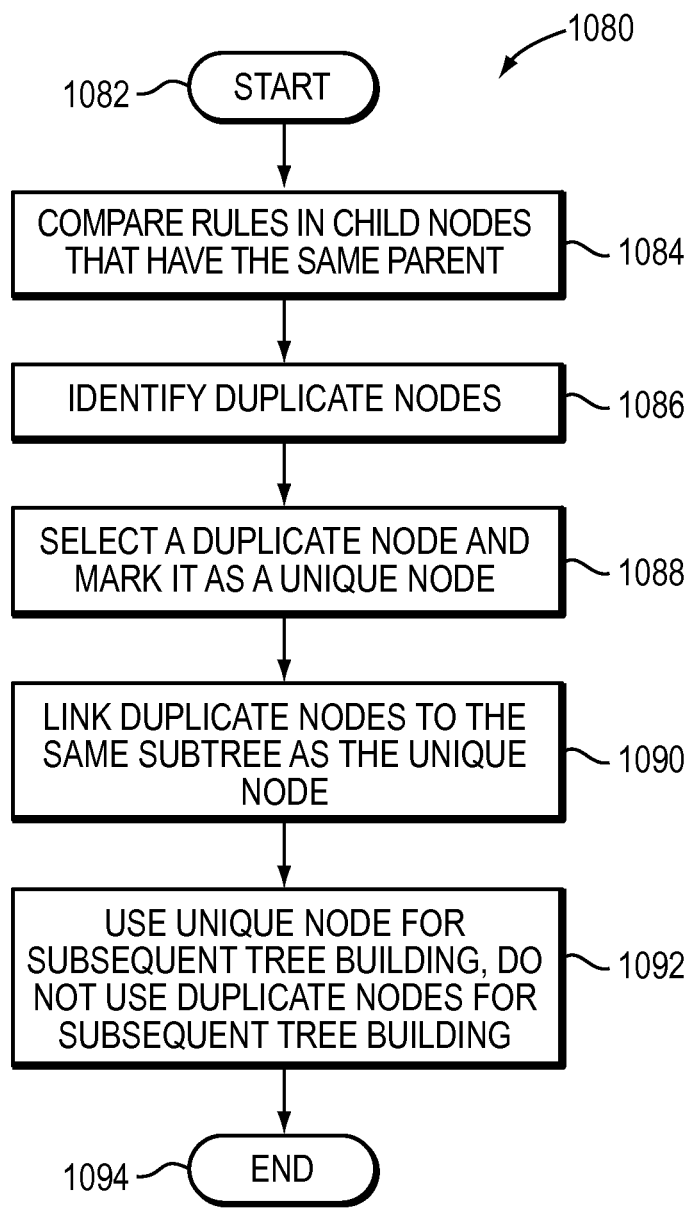
FIG. 10A is a flow diagram that illustrates a method identifying the child nodes that contain the same rule set.

FIG. 10A is a flow diagram that illustrates a method (1080) identifying the child nodes that contain the same rule set. The method begins (1082) and compares a subset of rules represented by child nodes having a same parent node (1084). Child nodes having the same parent may be called siblings. Child nodes of the same parent that contain the same rule set are identified as of duplicate child nodes (1086). One child node of the set of duplicate child nodes may be selected (marked) as a unique child node (1088). The other duplicate child nodes of the set of duplicate child nodes may be linked to the same subtree as the unique child node (1090). The unique child node may be used for subsequent building of the decision tree structure, and the other child nodes of the set of duplicate child nodes may not be used for subsequent building of the decision tree structure (1092) and the method ends (1094).

As stated above, packet classification may result in the matching of more than one rule from the rule classification table. A rule having a highest priority is chosen for classifying a received packet. Embodiments described herein may determine priority of rules for overlapping rules. Rather than storing a unique priority for each rule in a rule classification table, which is resource intensive and requires a great amount of storage space, embodiments described herein may categorize rules based on overlapping criteria. Rules may be categorized into priority groups and rules within each priority group may be assigned a unique priority. Rules within priority groups compete for a match. By assigning unique priority within a priority group, competing rules are prioritized. However, the priorities are only unique within the priority group, thus the same priority values may be shared with rules that do not compete, the reducing the total number of priority values needed. Priority duplication saves storage space by providing a priority value on a per overlapping criteria basis instead of requiring a unique priority value to be stored for each rule.

Figure 10B:
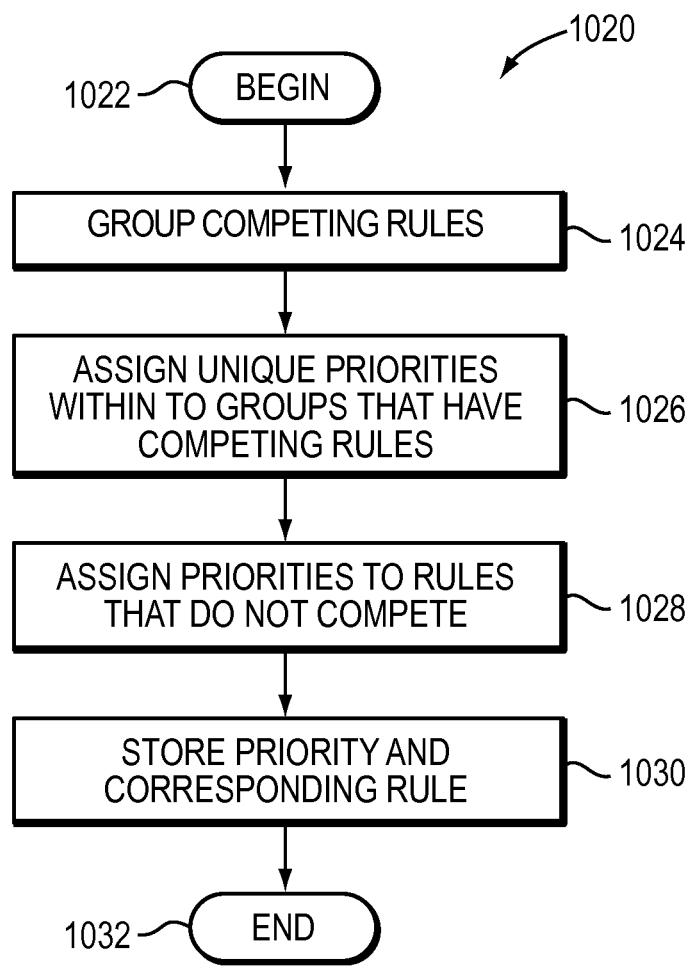
FIG. 10B is a flow diagram of a method for priority duplication.

FIG. 10B is a flow diagram of a method for priority duplication (1020). The method begins (1022) and groups rules based on whether or not the rules compete (1024). Priority values may be assigned to the plurality of rules. Unique priority values may be assigned within each group of competing rules (1026). Non-competing rules may be assigned a priority, the priority assigned to non-competing rules may overlap with the unique priorities assigned within the groups of competing rules (1028). The storing decision tree structure may store the plurality of rules and the priority value assigned (1030) and the method ends (1032).

Figure 10C:
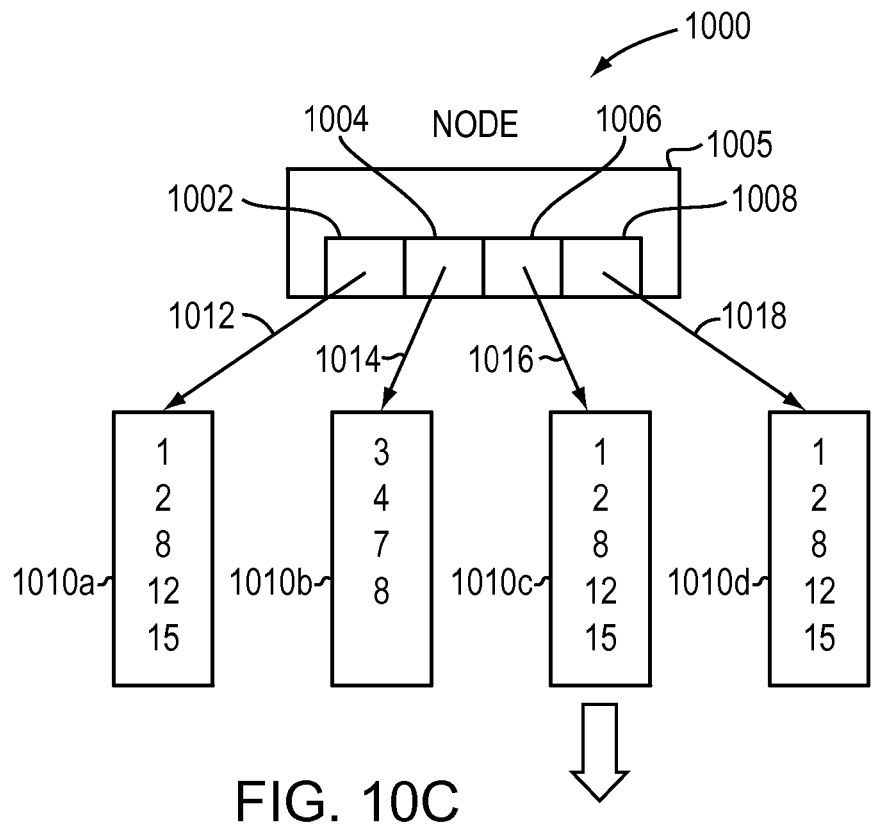
FIG. 10C-D illustrates a graphical example of removing duplicate buckets of rules in a node of a decision tree.

FIG. 10C illustrates a graphical example of removing duplicate buckets of rules in a node of a decision tree (1000). As illustrated, a node 1005 has 4 leaf nodes 1002, 1004, 1006, and 1008. The node 1005 shows 4 buckets 1010a-d containing a set of rules, the buckets 1010a-d are pointed to (1012, 1014, 1016, 1018) by leaf nodes 1002, 1004, 1006, and 1008, respectively. Buckets 1010a, 1010c, and 1010d all contain the same rules. Because the buckets 1010a, 1010c, and 1010d are identified to contain the same rules, and the duplicate buckets 1010c and 1010d may be removed from memory, keeping only unique buckets 1010a and 1010b.

Figure 10D:
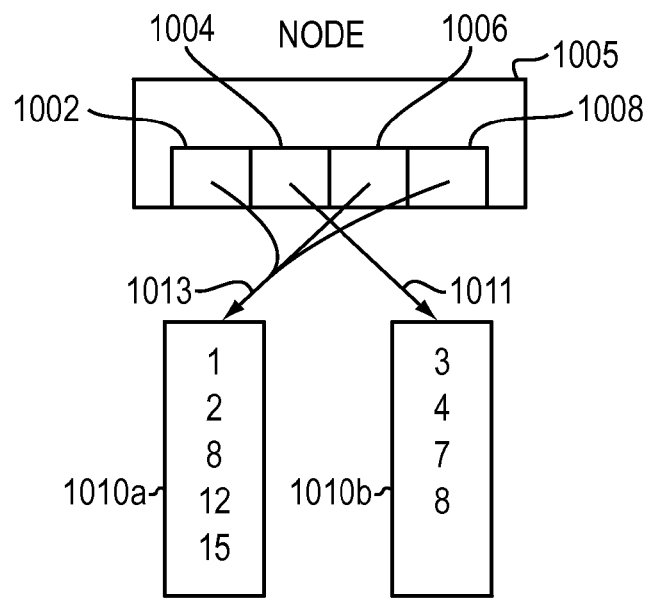

FIG. 10D shows node 1005 results in having two buckets (1010a and 1010b) containing rules that need to be stored in memory. Thus, the leaf nodes 1002, 1004, 1006, and 1008 of node 1005 only need to point to a memory location containing the set of rules in buckets 1010a and 1010b. For example, leaf nodes 1002, 1006, and 1008 all point (1013) to bucket 1010a, and leaf node 1004 points (1011) to bucket 1010b.

Figure 10E:
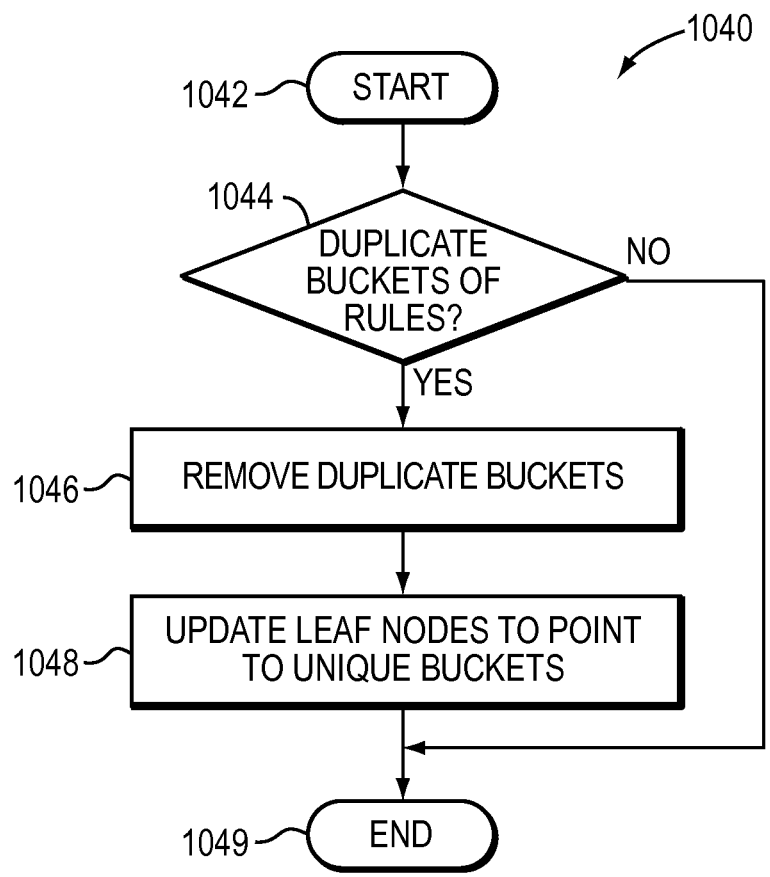
FIG. 10E illustrates a method for removing duplicate buckets of rules in a node of a decision tree.

FIG. 10E is a flow diagram of a method for removing duplicate buckets of rules in a node of a decision tree (1040). Method 1040 starts 1042 and identifies duplicate buckets of rules (1044). If duplicate buckets of rules are not identified, the method ends (1049). If duplicate buckets of rules are identified, duplicate buckets are removed (1046) and leaf nodes are updated to point to unique buckets (1048) and the method ends (1049).

Bucket duplication is not limited to child nodes having a same parent (e.g., siblings).

Figure 10F:
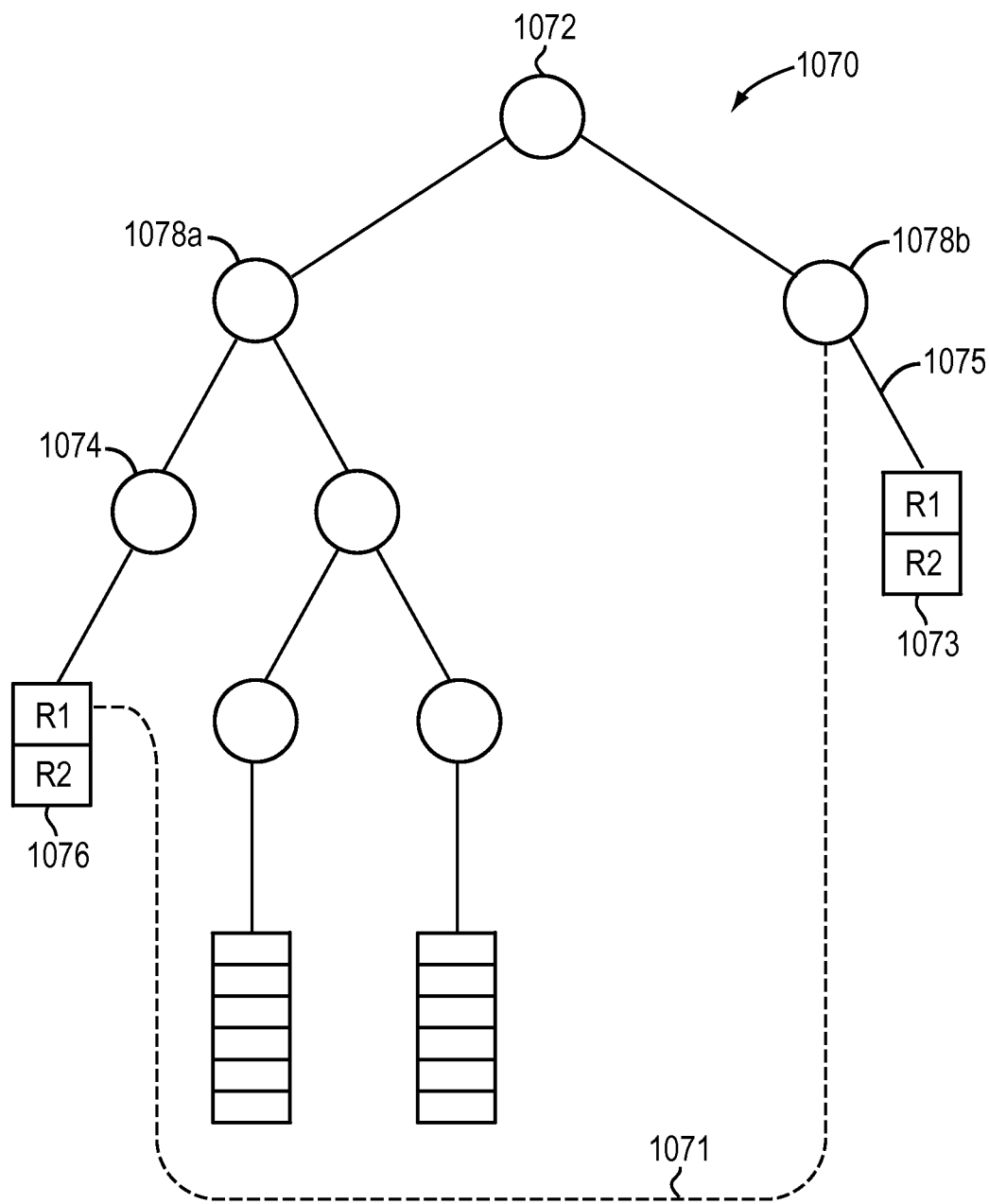
FIG. 10F illustrates a graphical example of removing duplicate buckets of rules from non-sibling nodes of a decision tree.

FIG. 10F is a graphical illustration of bucket duplication according to one embodiment. A portion of a tree (1070) is shown that includes a node 1072 that has child nodes 1078a and 1078b (leaf) and a grandchild node 1074. The child node 1078b (leaf) and grandchild 1074 (leaf) both point to buckets 1073 and 1076 respectively. The buckets 1076 and 1073 are duplicate buckets each including a duplicate rule set (e.g., R1 and R2). The bucket 1073 may be removed by pointing the child node 1078b to point 1071 to the bucket 1076 pointed to by the grandchild node 1074.

Figure 10G:
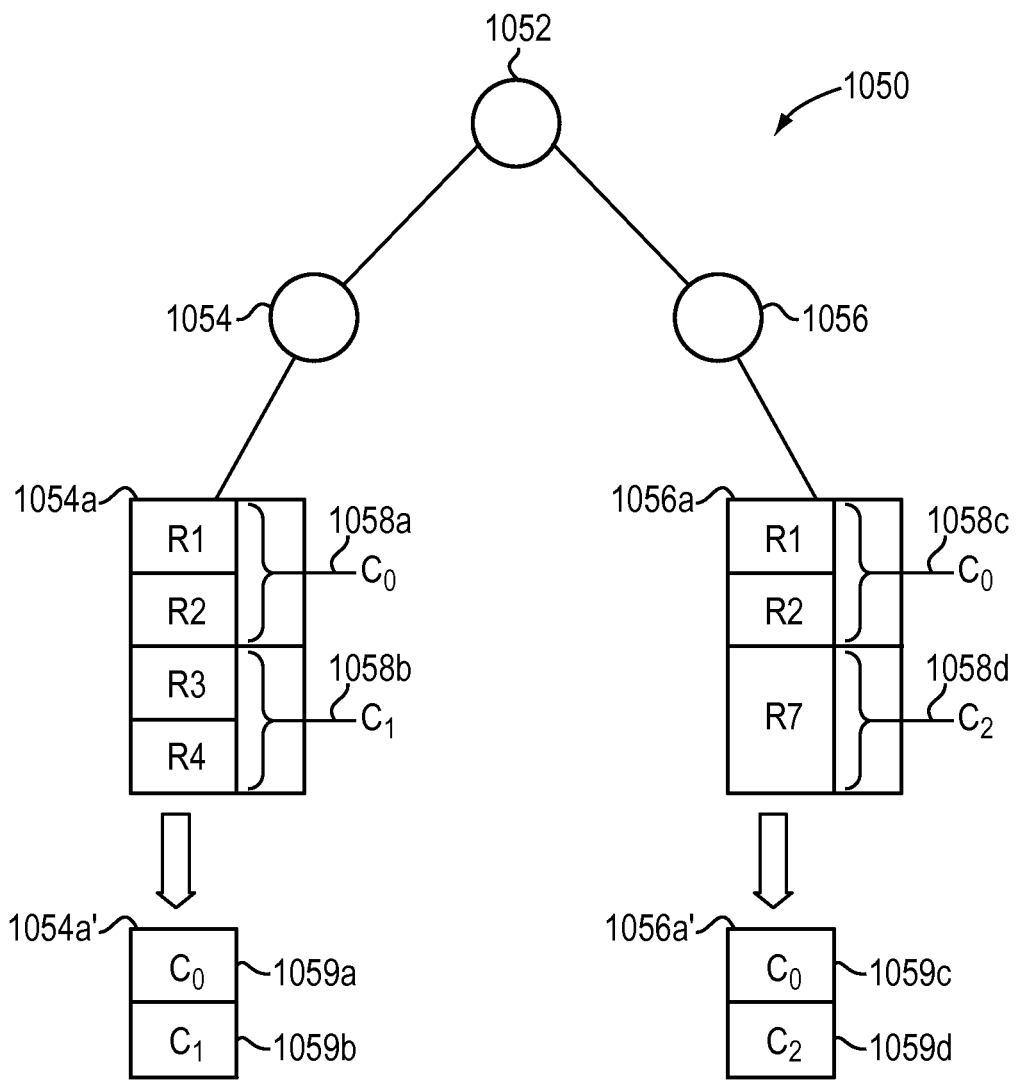
FIG. 10G illustrates a graphical example of removing partial duplicate buckets of rules in a node of a decision tree.

FIG. 10G is a graphical illustration of partial duplicate buckets of rules in a node of a decision tree. A portion of a tree (1050) is shown including a parent node 1052 and two children (leaves) 1054 and 1056 that point to buckets 1054a and 1056a respectively. Buckets 1054a and 1056a have a partial duplicate set of rules R1 and R2. The set of rules in each bucket may be split into subsets. For example, rules in the bucket 1054a may be split into a first set 1058a including R1 and R2 and a second set 1058b including R3 and R4. Rules in the bucket 1056a may be split into a first set 1058c including R1 and R2 and a second set 1058d including R7. The bucket entries may be replaced with a linked list of chunk pointers, or pointers to sets of rules. Bucket 1054a' illustrates bucket 1054a having bucket entries replace with a linked list of chunk pointers C0 and C1. Similarly, bucket 1056a' illustrates bucket 1056a having bucket entries replace with a linked list of chunk pointers C0 and C2. Chunk pointer C0 points to a set of rules including R1 and R2, chunk pointer C1 points to a set of rules including R3 and R4, and chunk pointer C2 points to a set of pointers including R7.

Figure 11A:
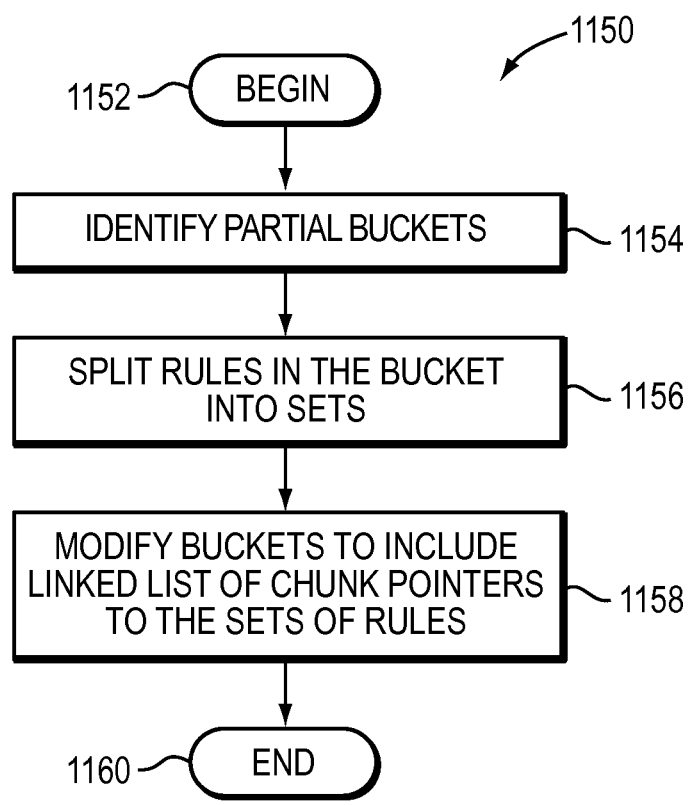
FIG. 11A is a flow diagram of a method for partial duplicate buckets of rules in a node of a decision tree.

FIG. 11A is a flow diagram of a method (1150) for partial duplicate buckets of rules in a node of a decision tree. The method begins (1152) and identifies a set of partial duplicate buckets (1154). Partial duplicate buckets each include a duplicate partial set of rules. The rules in each bucket are separated into a first and second set of rules. The first set of rules includes the duplicate partial set of rules and the second set of rules includes any remaining rules for the bucket (1156). Links (chunk pointers) are created to the first and second set of rules and the bucket is linked to the created links (1158) and the method ends (1160). Each partial duplicate bucket may be modified to store a linked list of the chunk pointers. The number of sets shown is an illustration, there could be multiple sets if there are multiple partial duplicates.

As stated above, rules may have multiple fields. Each field of the rule represents a field in a header of an incoming packet. Headers of packets generally include at least two fields, one field containing a source IP address field and a second field containing a destination IP address field. The rules may contain IP wildcards in either or both of the fields representing the source IP address field and destination IP address field of an incoming packet.

Embodiments described herein may separate rules into categories. The categories may be based on a function of the fields. The rules may be separated into categories in any suitable manner. The rules may be based on a function of the fields. For example, the rules may be categorized based on whether or not they have wildcards in the source and destination IP address fields. The categories may be as follows: 1) rules that do not have wildcards in either the source or destination fields, 2) rules that have wildcards in both the source and destination fields, 3) rules that have wildcards in the source field but not in the destination field, and 4) rules that have wildcards in the destination field but not in the source field. The fields may be any fields and any number of fields. For example, three fields may be used for categories, resulting in 8 categories. Also, instead of complete wild card, the category may be based on a field being "large" or "small." Large and small may be defined by a ratio of a range of a field value to its total space.

Figure 11B:
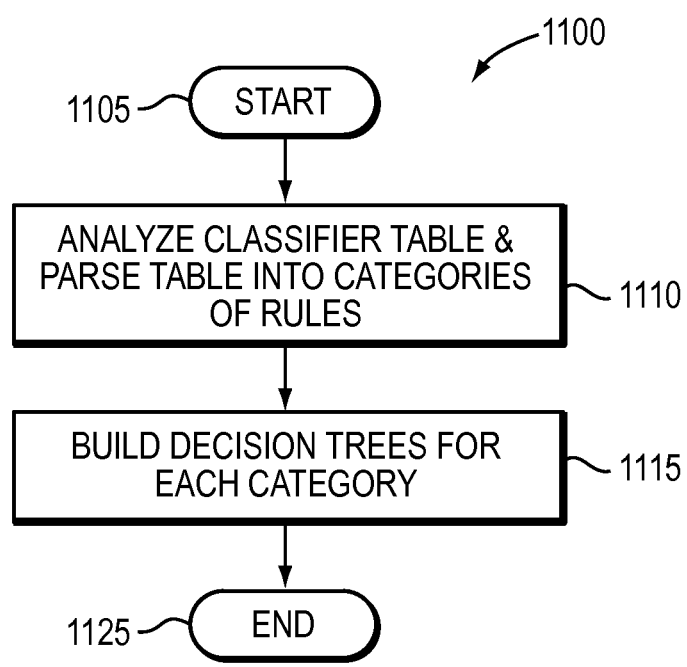
FIG. 11B illustrates a method for parsing a compiler table into categories of rules and building decision trees for each category.

FIG. 11B illustrates a method 1100 for parsing a classifier table into categories of rules and building decision trees for each category. Method 1100 begins at 1105 and then the method 1100 analyzes a classifier table and parses the table into categories of rules (1110). For each category of rules, the method 1100 builds a decision tree (1115), and the method ends (1125).

Figure 11C:
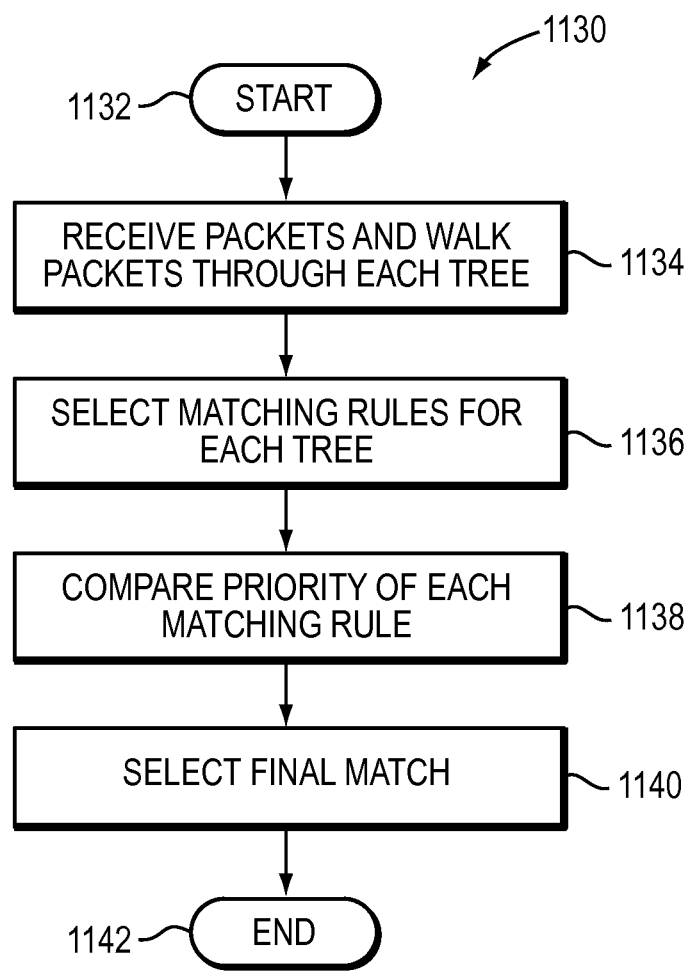
FIG. 11C illustrates a method for selecting a matching rule.

FIG. 11C illustrates a method 1130 for selecting a matching rule. Method 1130 begins at 1132. Received packets are walked by a runtime walker through each decision tree (1134). Each decision tree returns a matching rule if a matching rule is selected (1136). The priority of each matching rule is compared (1138) and a matching rule with the highest priority is selected (1140) and the method ends (1142).

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

Figure 12:
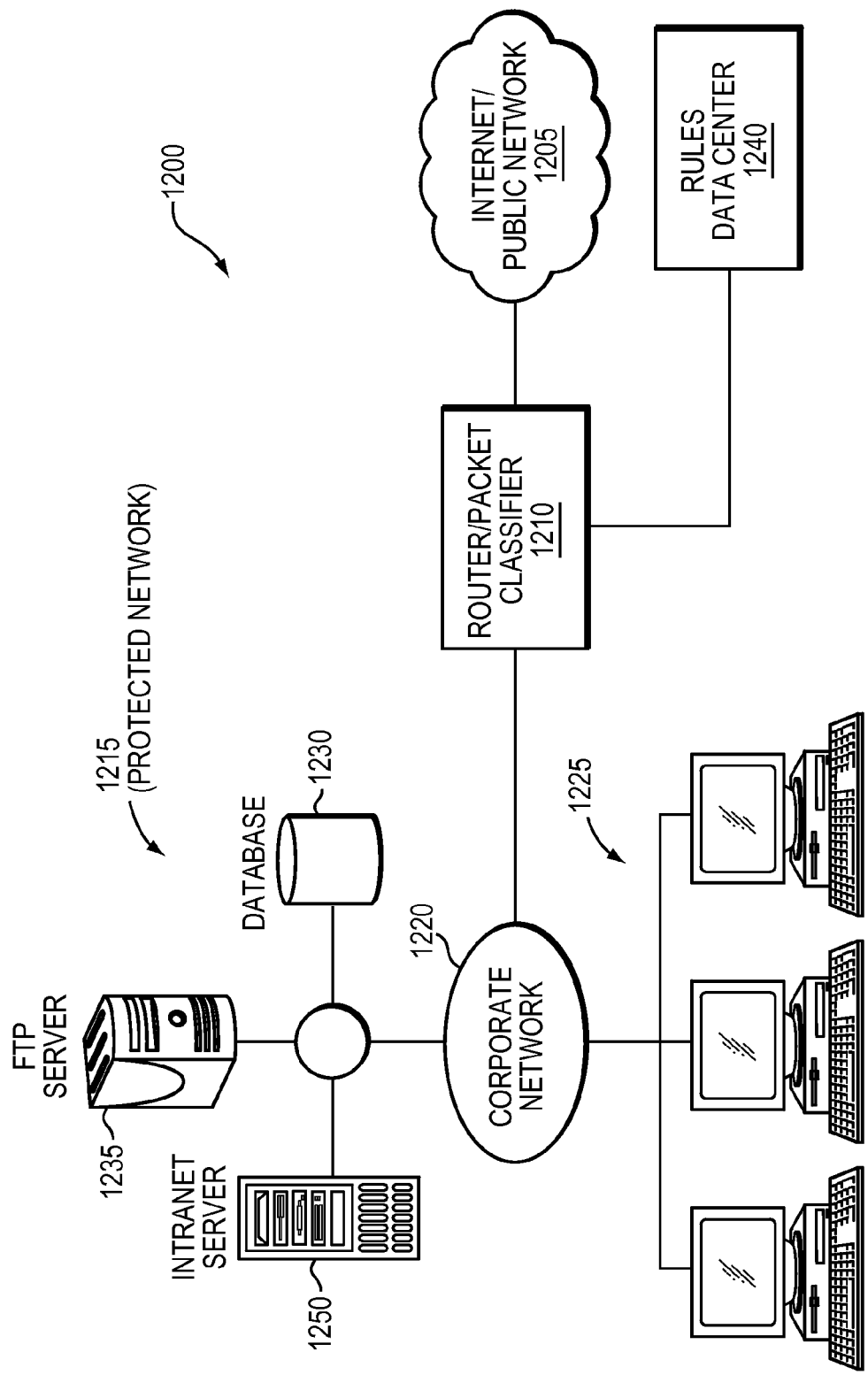
FIG. 12 is a block diagram illustrating a system in which a packet classifier operates to classify packets to provide internet services to a private network.

FIG. 12 is a block diagram illustrating a system 1200 that includes a router/packet classifier 1210, protected network 1215, and a public network 1205. The public network 1205 may comprise an unsecured wide-area network (WAN), such as the Internet, a wireless network, a local-area network, or another type of network. Protected network 1215 may comprise a secured computer network such as a local-area network (LAN) in an office or a data center. As illustrated, the LAN may be a corporate network 1220 including a plurality of work stations 1225. The plurality of work stations 1225 are operatively coupled to database 1230, FTP (file transfer protocol) server 1235, and intranet server 1250.

In system 1200, the router 1210 is connected to the public network 1205 and protected network 1215 such that network traffic flowing from public network 1205 to protected network 1215 flows first to the router 1210. The router 1210 may be a stand-alone network appliance, a component of another network appliance (e.g., firewall appliance), a software module that executes on a network appliance, or another configuration. The router 1210 may be connected to a rules datacenter 1240. In general, router 1210 inspects network traffic from public network 1205 and determines what actions to perform on the network traffic. For example, router 1210 classifies packets to implement a number of advanced internet services such as routing, rate limiting, access control in firewalls, virtual bandwidth allocation, policy-based routing, service differentiation, load balancing, traffic shaping, and traffic billing. These services require the router 1210 to classify incoming packets into different flows and then to perform appropriate actions depending on this classification.

Figure 13:
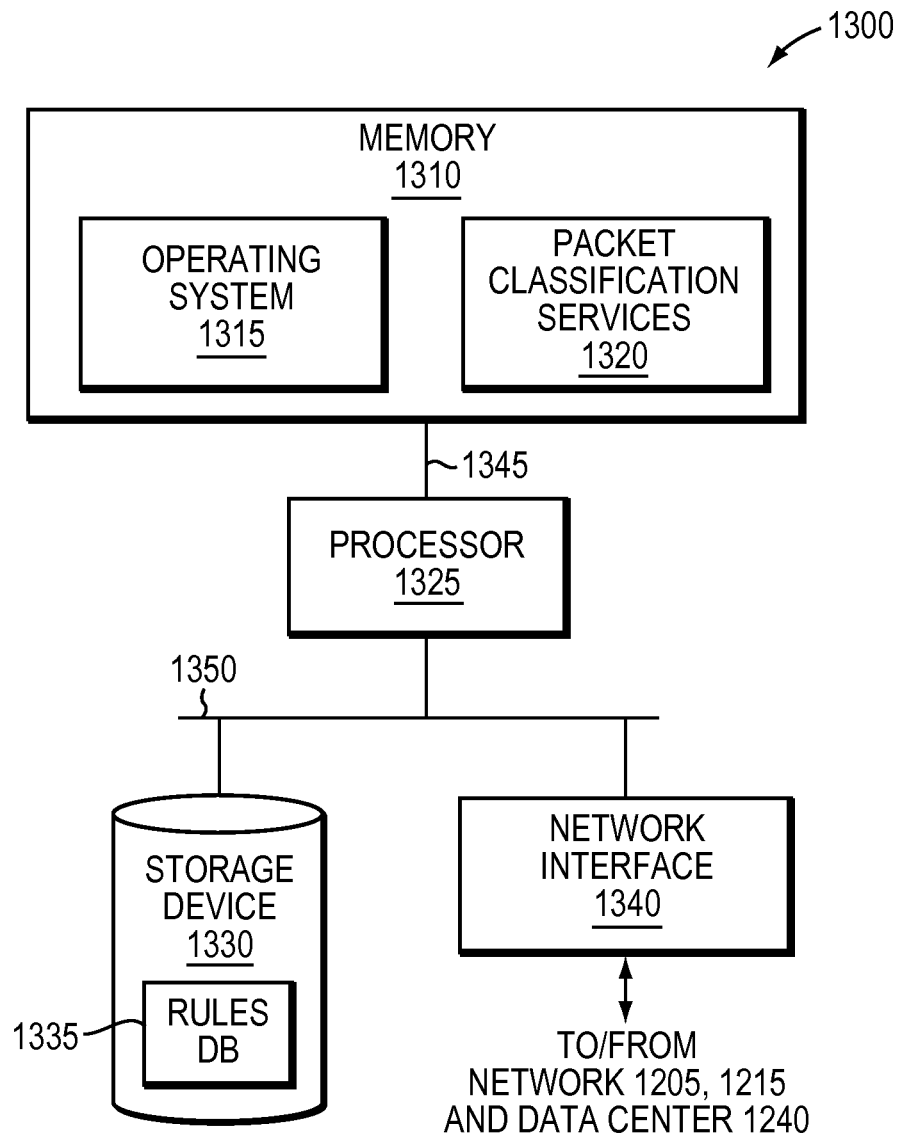
FIG. 13 is a block diagram of a router that may classify packets according to techniques disclosed herein.

FIG. 13 is a high-level block diagram of an exemplary router 1300 that may be used with embodiments described herein. Router 1300 comprises a memory 1310 coupled to a processor 1325 via a memory bus 1345 and, a storage device 1330 and a network interface 1340 coupled to the processor 1325 via an input/output (I/O) bus 1350. It should be noted that the router 1300 may include other devices, such as keyboards, display units and the like. The network interface 1340 interfaces the router 1300 with the secured network 1215, public network 1205, and rules datacenter 1240 and enables data (e.g., packets) to be transferred between the router and other nodes in the system 1200. To that end, network interface 1340 comprises conventional circuitry that incorporates signal, electrical and mechanical characteristics, and interchange circuits, needed to interface with the physical media of system 1200 and protocols running over that media.

The memory 1310 is a non-transitory computer-readable medium implemented as a RAM comprising RAM devices, such as DRAM devices and/or flash memory devices. Memory 1310 contains various software and data structures used by the processor 1325 including software and data structures that implement aspects of the embodiments described herein. Specifically, memory 1310 includes an operating system 1315 and packet classification services 1320. The operating system 1315 functionally organizes the router 1300 by invoking operations in support of software processes and services executing on router 1300, such as packet classification services 1320. Packet classification services 1320, as will be described below, comprises computer-executable instructions to compile a decision tree data structure from a given set of rules and walk incoming data packets through the compiled decision tree data structure.

Storage device 1330 is a conventional storage device (e.g., disk) that comprises rules database (DB) 1335 which is a data structure that is configured to hold various information used to compile a decision tree data structure from a given set of rules. Information may include rules having a plurality of fields corresponding to headers of incoming data packets.

As described above, each time a packet arrives, a runtime walker may traverse the decision tree to find a leaf node that stores a small number of rules. Each rule has 'F' fields and an ith field of a rule R, referred to as R[i], is a regular expression on the ith field of a received packet header. A packet P matches a particular rule R if for every i, the ith field of the header of P satisfies the regular expression R[i].

Once the leaf node is reached, a linear search of the rules within the leaf node may occur to find a matching rule.

A key, such as data extracted from header tuples of the packet, may be used by the runtime walker for matching against rules. Embodiments disclosed herein may store, at each node, a number of bits a runtime walker should skip over as well as the number (identifier) of the field whose bits are to be skipped. As a result, the number of tree nodes that a runtime walker must traverse may be reduced, resulting in shorter search times. As a key is searched for in the tree, each node may consume the next n contiguous bits of one or more fields. Such strings of contiguous bits may be referred to herein as strides. Strides may be concatenated to form an index determining which child nodes of a node to search next. Nodes that store a corresponding stride (also referred to herein as a stride value) may be referred to herein as stride nodes, or nodes having a stride node type. A stride node may be cut on a contiguous number of bits. The contiguous bits may be contiguous with respect to a marker (also referred to herein as an anchor).

Figure 14:
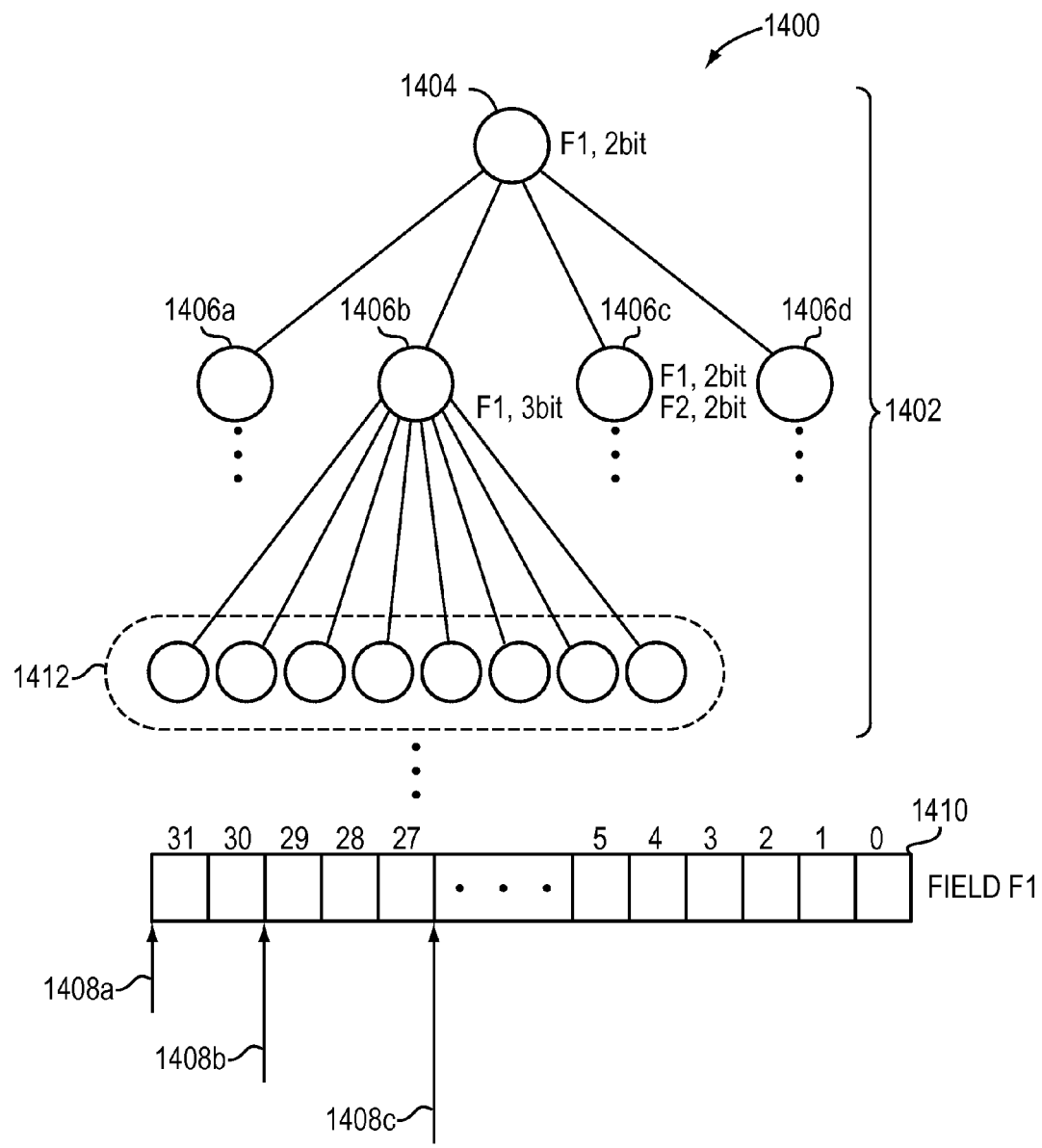
FIG. 14 is a block diagram of an example embodiment of a tree with stride nodes.

FIG. 14 is a block diagram of an example embodiment of a tree with stride nodes (1400). In the example embodiment, the tree 1402 includes a node 1404 that has been cut on a selected field F1 1410 using two bits to cut the node 1404 into four children 1406*a-d*. The field F1 1410 may be a thirty-two bit field as shown. Before cutting the field F1 1410, a marker 1408*a* may be set to indicate a most significant bit (e.g., bit 31) of the field F1 1410. The two bits used to cut the node 1404 may be contiguous bits with respect to the marker 1408*a*. The marker 1408*a* may be updated by moving the marker two bits such that the updated marker 1408*b* indicates a next bit that may be used for a subsequent cut of the field F1 1410. In the example embodiment, the node 1404 and its children 1406*a-d* are stride nodes. In the example embodiment, the child node 1406*b* is cut using three bits of F1 to create the eight children 1412. As such, a marker for the child node 1406*b* may be the marker 1408*b* moved by three bits as shown by the moved marker 1408*c*. In this manner, each node may have a marker for each field, the marker for each field indicating a next bit that may be consumed for cutting. For example, the child node 1406*c* is shown as having been cut using two bits of field F1 and two bits of field F2 (not shown). As such, the child node 1406*c* may have a marker for each of the fields F1 1410 and F2.

If a node is a stride node, the node may store a stride value indicating a number of bits consumed at the node. A walker may utilize stride values stored associated with each node and each field of rules of the node, enabling the walker to determine a marker location for each field at each node. In the example embodiment of FIG. 14 above, the node 1404 may have a stride value of two for the field F1 1410, whereas the child node 1406*b* may have a stride value of three for the field F1 1410, and the child node 1406*c* may have a stride value of two for the fields F1 1410 and F2.

An initial marker may be stored at a root node of a tree enabling a walker to determine context for cutting of a node (e.g., which bits were used to cut the node) based on the initial marker and all stride values of the nodes traversed to reach the node. For example, if the node 1404 is a root node with an initial marker 1408*a*, a walker may use the stride values two and three from the nodes 1404 and 1406*b* to determine a marker location 1408*c* for the field F1 1410 of the children 1412. In the example embodiment, stride bits are used in a direction of most significant bit to least significant bit, however stride bits may be taken in the direction least significant bit to most significant bit as well, so long as a direction for the selection of a next one or more bits to use for cutting is consistent from cut to cut and so long as a contiguous one or more bits is selected. As such, stride nodes have a limitation in that the bits used for cutting (e.g., stride bits) need to be contiguous and selected in a consistent manner with respect to direction.

According to embodiments disclosed herein, a decision tree may have stride nodes, mask nodes, or a combination thereof. In contrast to a stride node that may cut a field using a marker for the field and select one or more contiguous bits adjacent to the marker to use for cutting, a mask node may select one or more arbitrary bits of the field, contiguous or non-contiguous, provided the bits were not consumed (e.g., used) to cut the same field of an ancestor of the node. An ancestor may be any node traversed (e.g., cut) in order to reach the node.

According to embodiments disclosed herein, a node may have a node type including at least a stride node type and a mask node type. A node having the stride node type may be referred to herein as a stride node, as described above. A node having the mask node type may be referred to herein as a mask node. A mask node removes restrictions of stride nodes, such as markers and consumption of contiguous bits. Mask bits (e.g., one or more bits selected for cutting a field of a mask node) are unanchored, arbitrary (e.g., contiguous or non-contiguous) bits, and mask bits may be selected based on an arbitrary direction (e.g., most significant bit to least significant bit or least significant bit to most significant bit). As long as a bit of a field is a non-consumed bit, the bit may be used for cutting a field in a mask node. An advantage of a mask node is that the mask node may consume fewer resources (e.g., memory) than a stride node. A compiler building the decision tree may determine the type of node to create, creating a tree having all stride nodes, all mask nodes, or a combination of stride and mask nodes.

Figure 15:
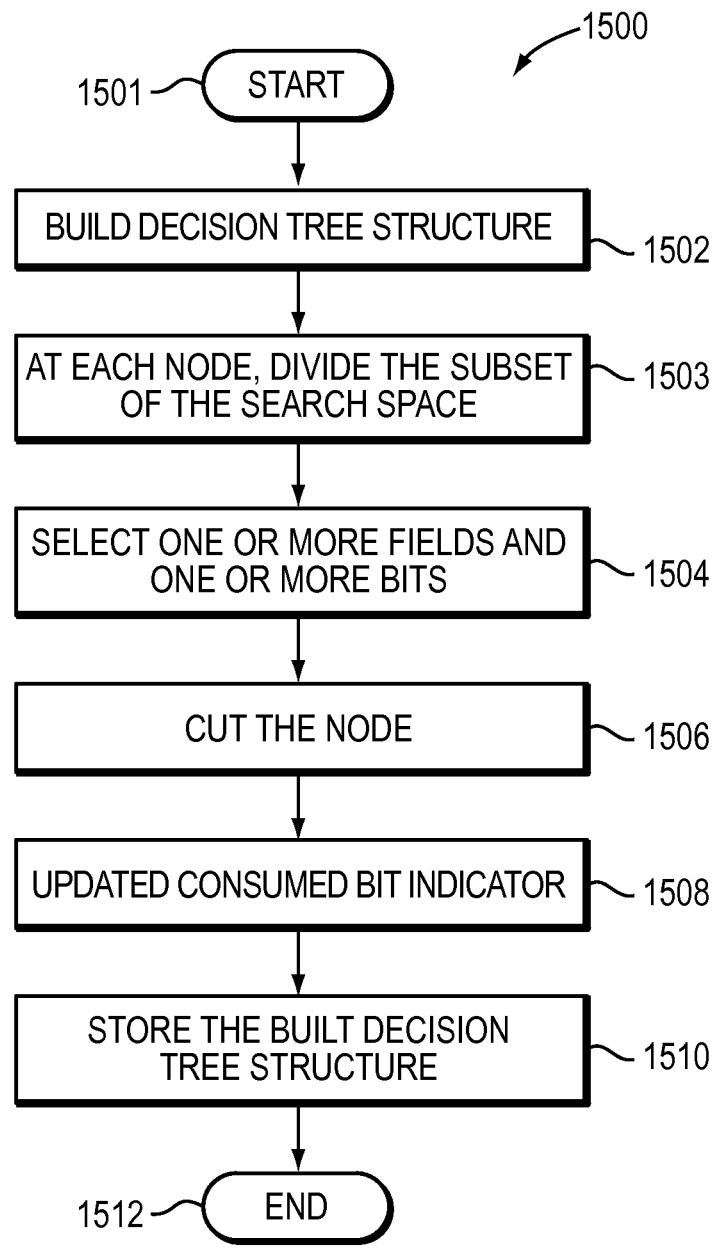
FIG. 15 is a flow diagram of an example embodiment of a method for building a decision tree structure.

FIG. 15 is a flow diagram of an example embodiment of a method for building a decision tree structure (1500). The method may begin (1501) and build a decision tree structure including a plurality of nodes using a classifier table having a plurality of rules representing a search space (1502). The plurality of rules may have at least one field. Each node may represent a subset of the search space. Building the decision tree structure may include, at each node, dividing the subset of the search space represented by the node into smaller subsets (1503) of rules by selecting one or more fields of the at least one field and selecting one or more bits of the selected one or more fields based on a node type and a consumed bit indicator for the node, the consumed bit indicator specifying all bits consumed for search space division by each ancestor of the node (1504), and by cutting the node into child nodes on the selected one or more bits to create the smaller subsets of rules and allocating the created smaller subsets to the child nodes (1506). The method may update the consumed bit indicator to specify the selected one or more bits as utilized and associating the updated consumed bit indicator with each of the child nodes (1508). The method may store the built decision tree structure (1510) and the method thereafter ends (1512) in the example embodiment.

Figure 16:
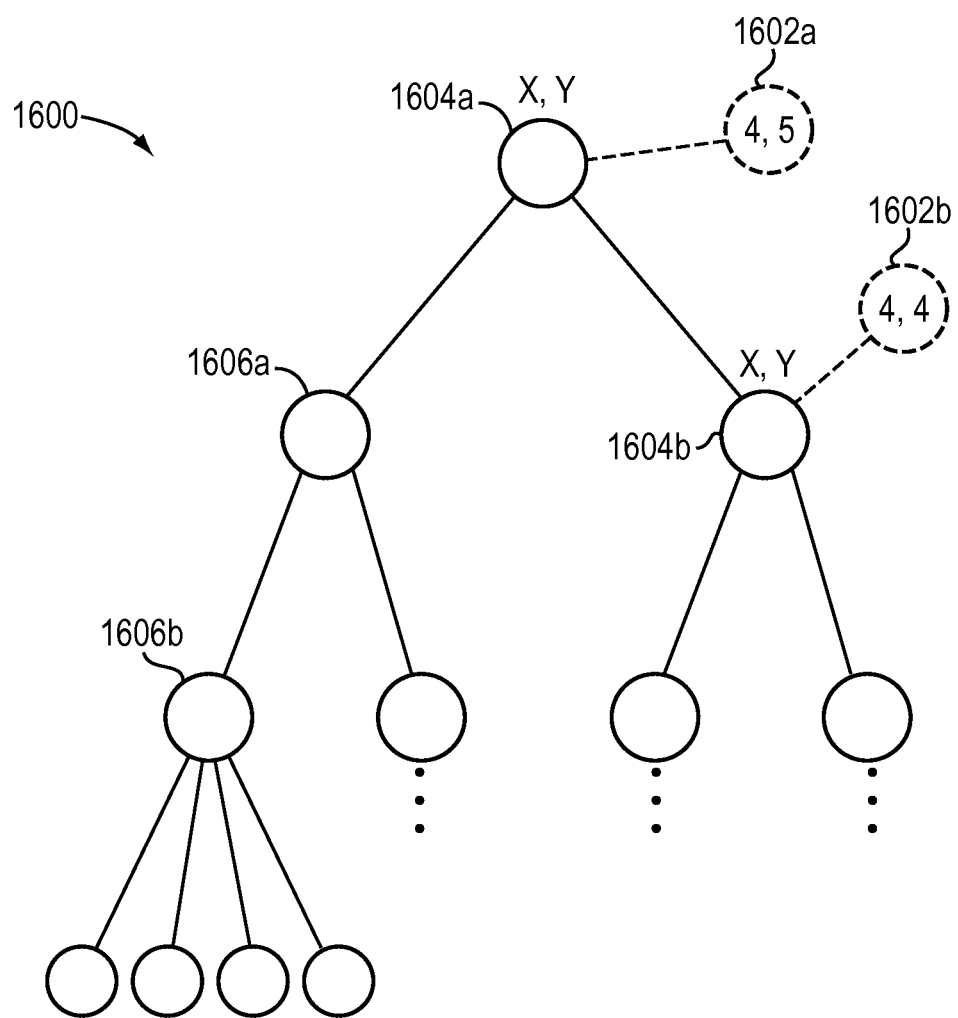
FIG. 16 is a block diagram of an embodiment of a decision tree structure that includes stride nodes and mask nodes.

FIG. 16 is a block diagram of an embodiment of a decision tree structure that includes stride nodes and mask nodes (1600). In the decision tree structure 1600, stride nodes 1604*a* and 1604*b* may store consumed bit indicators, such as stride values 1602*a* and 1602*b* for fields, such as X, Y fields or any other suitable field dimensions. The decision tree structure 1600 includes mask nodes 1606*a* and 1606*b* that may include node descriptions, such as bitstrings 1606*a* and 1606*b*. Mask nodes or stride nodes may be described by a bitstring. For example, a mask node may be represented as a masked value, or description, in the form of a bitstring. A node's description describes its extent (values covered) in all dimensions (fields). For non-mask fields, the extent may be described as a range. For mask fields, the extent may be described as a bitstring with don't-care bits. Mask fields may be advantageous over a range for describing the extent in some scenarios. For example, a single mask may enable enumeration of non-contiguous regions of field values whereas multiple ranges would be needed for representing each region. Alternatively, it may be useful to use a range for describing the extent as a single range may enable enumeration for a region that would otherwise require multiple masks to be described. In general, a node or rule may be described by ranges, masks, bitstrings, or any combination thereof.

For example, a one-field node covering values [8-15] out of a search space [0-15] may be represented by a node description or bitstring, such as 1xxx, where the x's represent don't-care bits. Similarly, a rule may be represented as a rule description or bitstring. For example, if a rule matches only even values, its description may be represented as xxx0. As described above, similar to a node, a rule may be described by ranges, masks, bitstrings, or any combination thereof. While examples shown may include a single field, it should be understood that nodes and rules may be represented by multiple fields (i.e., multi-dimensional as described above). If represented by multiple fields it should be understood that the various operations or checks described as being performed on the single field need to be performed separately for each of the multiple fields, for example, the operations would be performed for each at least one field.

As the compiler builds the search tree, each node corresponds to a subset of the search space (i.e., entire set of key values) and describes how to cut it into smaller subsets. Cutting a node means partitioning the node's portion of the search space into smaller search spaces, one for each child node. According to one embodiment, a compiler's method for creating a mask node may be described as follows. The compiler may start with a masked bitstring describing the node to be cut. For example, if a 5-bit field has already been cut on two bits (i.e., a particular two bits have been consumed), the current node might be described as 1xx0x. A bitstring, such as 1xx0x in the example embodiment, may be referred to as a node description for the node. In the node description (e.g., bitstring) a '1' represents a bit that must be one, a '0' indicates a bit that must be zero, and an 'x' represents a don't care bit that may be one or zero. In the example embodiment, the field has already been cut on the bits represented by either a '0' or a '1', as such, the bits having '0' or '1' values are consumed bits.

The bitstring may have its don't care bits expanded with values of 0 and 1 such that all possible values for the node may be determined based on the description provided by the bitstring. In the example embodiment, the node may be understood to cover eight values of the search space, enumerated by filling in the eight possible values in the x locations of the bitstring. According to embodiments disclosed herein, the compiler chooses some or all of the don't-care bits to cut on, as the don't care bits indicate non-consumed bits. In the example embodiment, the compiler may select the don't care bits of the bitstring in the bit 0 and bit 3 positions, where bit 0 is the right most bit or least significant bit. In the example embodiment, as a result, the compiler may assign the four possible values to the two chosen bits, resulting in the following descriptions of the four children: 10x00, 10x01, 11x00, 11x01. In the example embodiment, each of the children covers 2 values in the search space, a quarter of the original node's coverage.

Figure 17:
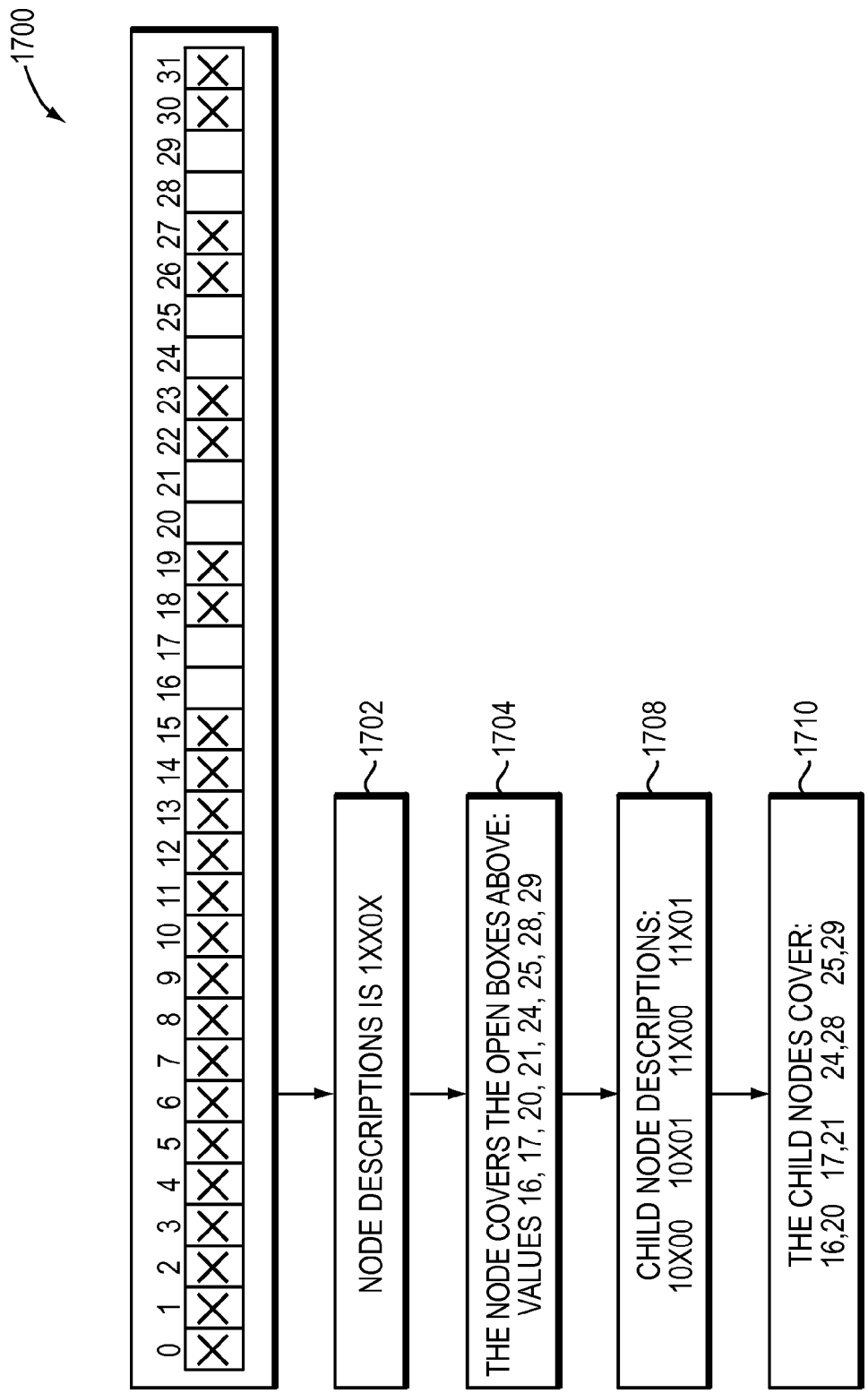
FIG. 17 is a block diagram of an example embodiment of a node description.

FIG. 17 is a block diagram of an example embodiment of a node description 1702. In the example embodiment, a node with the node description 1702 may cover values 1704 and have child nodes with descriptions 1708 such that the child nodes cover values 1710.

Figure 18:
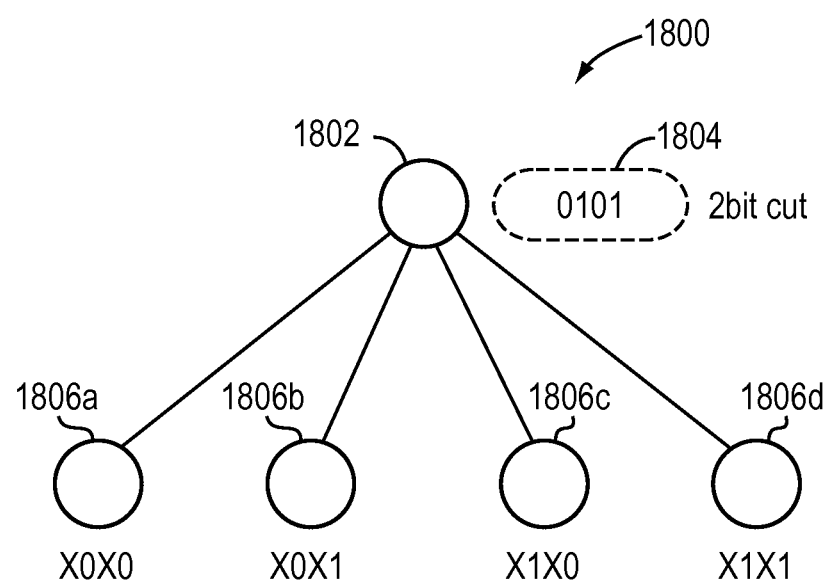
FIG. 18 is a block diagram of another example embodiment of a node description.

FIG. 18 is a block diagram of another example embodiment of a node description (1800). In the example embodiment a node 1802 may be a mask node initially described as xxxx, before cutting. The compiler may select which bits to cut on, such as the two bits represented as 1s in the mask 1804. Cutting the node 1802 may result in four children 1806a-d. The compiler may specify values for the two bits, unique for each of the four children 1806a-d and the children 1806a-d may inherit the don't-cares in the other two bits because the compiler has not affected those bits. As such, in the example embodiment, the children 1806a-d may have respective node descriptions x0x0, x0x1, x1x0, and x1 x1, where enumeration of the x bits may result in all possible values of the children 1806a-d.

According to embodiments disclosed herein, a function of the compiler may be to determine which of the rules intersecting a parent node intersect each of the child nodes. The method for determining whether a rule intersects a node is to compute the intersection of the node's description and the rule's description, and determine whether or not it is empty. According to embodiments disclosed herein, intersecting two descriptions may be done on a bit-by-bit basis according to the following rules. A don't-care bit intersected with another don't-care bit yields a don't-care bit; a don't-care bit intersected with a value yields the value; a value intersected with an equal value yields that value; and a value intersected with an unequal value means the entire intersection is empty. If the intersection is empty, the rule does not belong to the node, otherwise it does.

For example, rule matching of all even values may be described as xxxx0. Intersecting such a rule with the first child above (i.e., 10x00) yields the description 10x00. This is non-empty, so the rule intersects the first child. Another example for rule matching all odd numbers may be described as xxxx1. Intersecting such a rule with the first child above (i.e., 10x00) yields an empty intersection, because the differing values in the last bit cause the intersection to be empty. As such, the rule does not intersect the first child.

As described above, in general, a node or rule may be described by ranges, masks, bitstrings, or any combination thereof. As such, a node or rule description may include at least one range represented by a minimum value and a maximum value for at least one of the at least one fields. Computing the intersection between the node description for the child node and rules represented by the parent node would further include determining a non-empty intersection for the at least one of the at least one fields if (i) the rule minimum value is less than or equal to the child node maximum value and (ii) the rule maximum value is greater than or equal to the child node minimum value.

Figure 19:
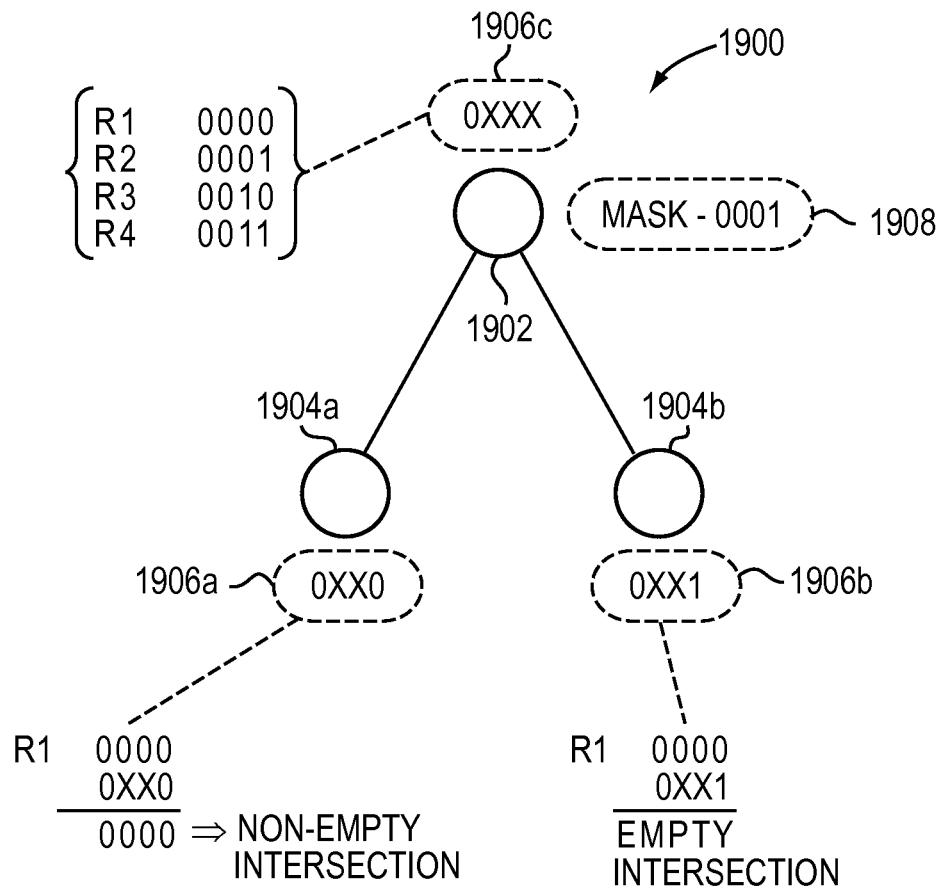
FIG. 19 is a block diagram of an example embodiment for computing the intersection of rules belonging to a parent node with the node description of the child node.

FIG. 19 is a block diagram of an example embodiment for computing the intersection of rules belonging to a parent node with the node description of the child node (1900). A node 1902 may be cut into two children 1904a and 1904b. The node 1902 may have a node description 1906c, such as 0xxx, and a mask 1908, such as 0001, that results in cutting rules of the node 1902 into even and odd rules assigned to the two children 1904a and 1904b. The child node 1904a may have a node description 1906a, such as 0xx0, whereas the child node 1904b may have a node description 1906b, such as 0xx1. The node descriptions 1906a and 1906b of the child nodes 1904a and 1904b are based on the mask 1908 of the node 1902 from which they were cut (e.g., node 1902 is a parent node). In the example embodiment, to determine if a rule of the parent node 1902 intersects with a node description of the child 1906a, empty or non-empty intersection computations may be employed as described above. For example, based on the mask 1906c being 0xxx, rules of the parent node 1902 may be enumerated as R1 0000, R2 0001, R3 0010, and R4 0011. Intersecting the parent node 1902 rule R1 0000 with the node description 1906a that is 0xx0 yields a non-empty intersection of 0000. As such, the child node 1904a includes the rule R1 0000. However, intersecting the parent node 1902 rule R1 0000 with the node description 1906b that is 0xx1 yields an empty intersection, thus, the child node 1904b does not include the rule R1 0000. As described above, if the intersection is empty, the rule does not belong to the child node, otherwise it does. It should be understood that the check for the empty or non-empty intersection needs to be performed for each at least one field and that if an empty intersection result is determined for any one of the at least one fields the resulting intersection is empty.

According to embodiments disclosed herein, another function of the compiler is determining whether one rule completely covers another within the node. A higher priority rule covers a lower priority rule if every value which matches the second also matches the first. The first step in determining this is intersecting each rule with the node, as described above. Any rule that does not intersect the node cannot cover or be covered within it. Then each pair of rules (intersected with the node) may be compared bit by bit. If both rules have a value for a bit but they're different, the first does not cover the second. If the first rule has a value for a bit but the second has a don't-care, the first does not cover the second. If neither of these conditions applies to any bit, the first rule covers the second.

For example, the description of a rule, such as R1, may be 10x00 and the description of rule R2 may be xxxx0. Rule R1, may match just the values 16 and 20, and rule R2, may match all even numbers. As described above, the compiler may start with a masked bitstring describing the node to be cut. In the example above, if a 5-bit field has already been cut on two bits, the current node might be described as 1xx0x. The compiler may select the don't care bits of the bitstring 1xx0x in the bit 0 and bit 3 positions, and, as a result, the compiler may assign the four possible values to the two chosen bits, resulting in the following descriptions of the four children: 10x00, 10x01, 11x00, 11x01. In the example, the intersection of R1 with the first child is 10x00, and the intersection of R2 and the first child is the same (i.e., 10x00) as the intersection of R1 with the first child. Neither of the disqualifying conditions above apply, so R1 does cover R2 within the first child, even though R2's original definition matches many more values than R1's, in the example. The example intersection operations have been shown with a single field, however rules or nodes having multiple fields would perform the intersection operation for each corresponding field. If an intersection of any of the multiple fields is empty then the intersection as a whole yields an empty intersection. A non-empty intersection is non-empty so long as all corresponding field intersections for each of the multiple fields (i.e., for each at least one field) is non-empty. As such, it should be understood that for one rule to completely cover another rule within a node, it must cover it in each dimension. A redundancy test is true if the redundancy test on each dimension is true.

Figure 20:
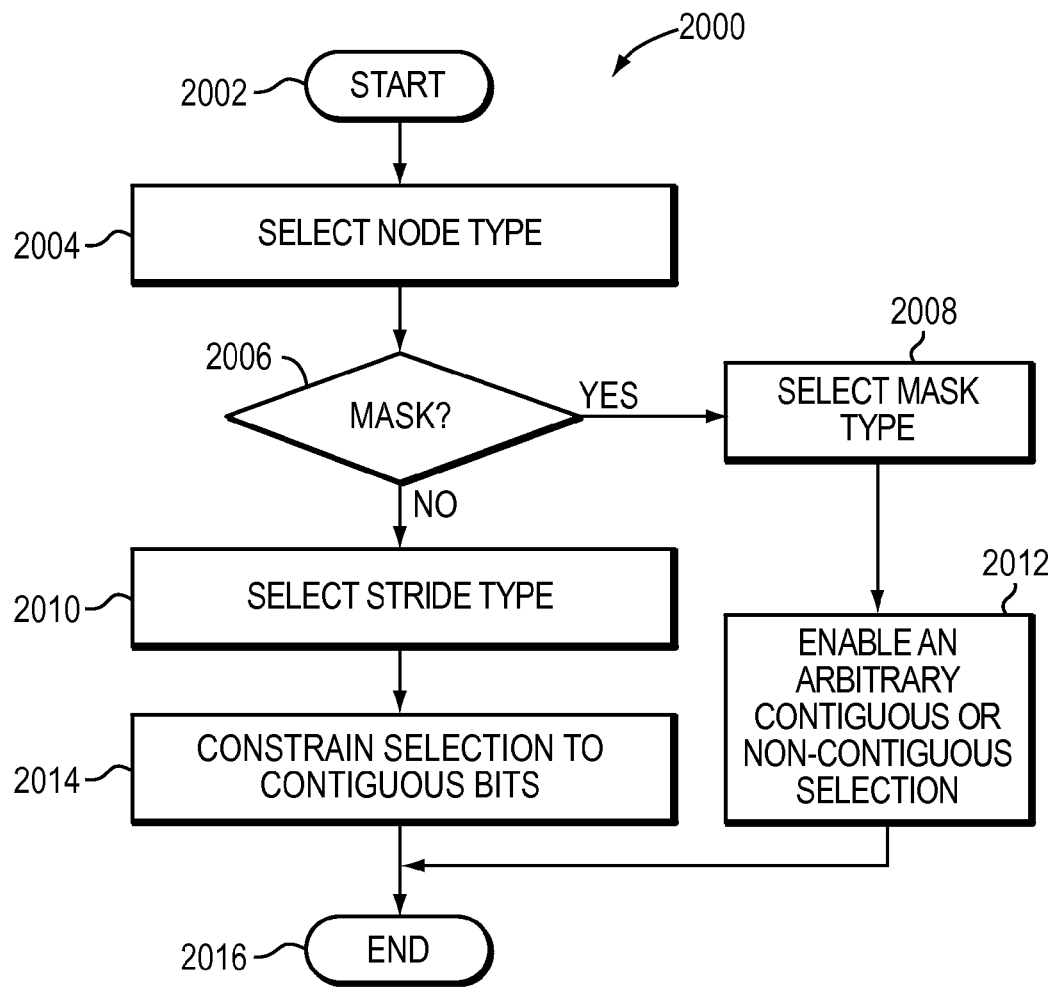
FIG. 20 is flow diagram of an example embodiment of a method for dividing the subset of the search space represented by a node into smaller subsets.

FIG. 20 is flow diagram of an example embodiment of a method for dividing the subset of the search space represented by a node into smaller subsets (2000). The method may begin (2002) and select the node type (2004). A check may be made for whether or not to select the mask node type (2006). If yes, the mask node type may be selected (2008) and the method may enable an arbitrary contiguous or non-contiguous selection of the one or more bits from a set of bits including all non-consumed bits for search space subdivision by each ancestor of the node (2012) and the method thereafter ends (2016) in the example embodiment. The consumed bit indicator for the selected mask node type may be a bit mask representing a consumed state for each bit in the selected one or more fields. For example, in the example described above, if a 5-bit field has already been cut on a particular two bits, a current node might be described as 1xx0x. As such, a consumed bit indicator may be a bit mask indicating that the particular two bits have been consumed. The consumed bits may be specified in any suitable manner, such as to differentiate consumed bits from non-consumed bits.

If the selection for mask node type is no, the stride node type may be selected (2010) and the method may constrain selection of the one or more bits to one or more contiguous non-consumed bits adjacent to and of lesser significance than a least significant consumed bit specified by the consumed bit indicator (2014) and the method thereafter ends (2016) in the example embodiment. The consumed bit indicator for the selected stride node type may include a bit location marker indicating a bit location of a most significant non-consumed bit. Given the selected stride node type and a parent node of the node having the mask node type, cutting the node into child nodes on the selected one or more bits may include selecting a first bit of the selected one or more bits. The first bit cut may be adjacent to and of lesser significance than a least significant bit used to cut the parent of the node. According to embodiments disclosed herein, the consumed bit indicator (e.g., a mask or stride value) may be stored in a node and used by the walker for traversing the tree. Alternatively, a walker may dynamically build context based on compiler information stored in a root node of the tree.

Figure 21:
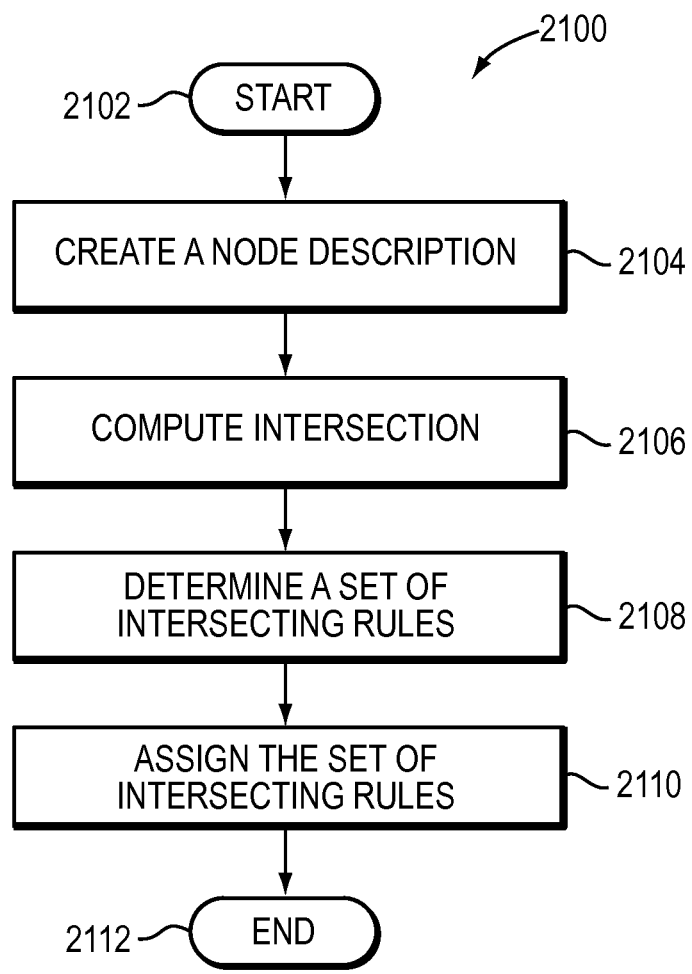
FIG. 21 is flow diagram of an example embodiment of a method.

FIG. 21 is flow diagram of an example embodiment of a method (2100). The method may begin (2102) and for each child node, create a node description for the child node based on the selected one or more bits. The node description may be a mask represented as a bitstring including ones, zeroes, or don't care bits, or a combination thereof, in arbitrary bit locations of the mask. The mask may be a one-dimensional or multi-dimensional mask. The method may compute on a bit-by-bit basis an intersection between the node description for the child node and rules represented by the parent node (2106) to determine a set of intersecting rules (2108) and assign the set of intersecting rules determined to the child (2110) and the method thereafter ends (2112) in the example embodiment.

Figure 22:
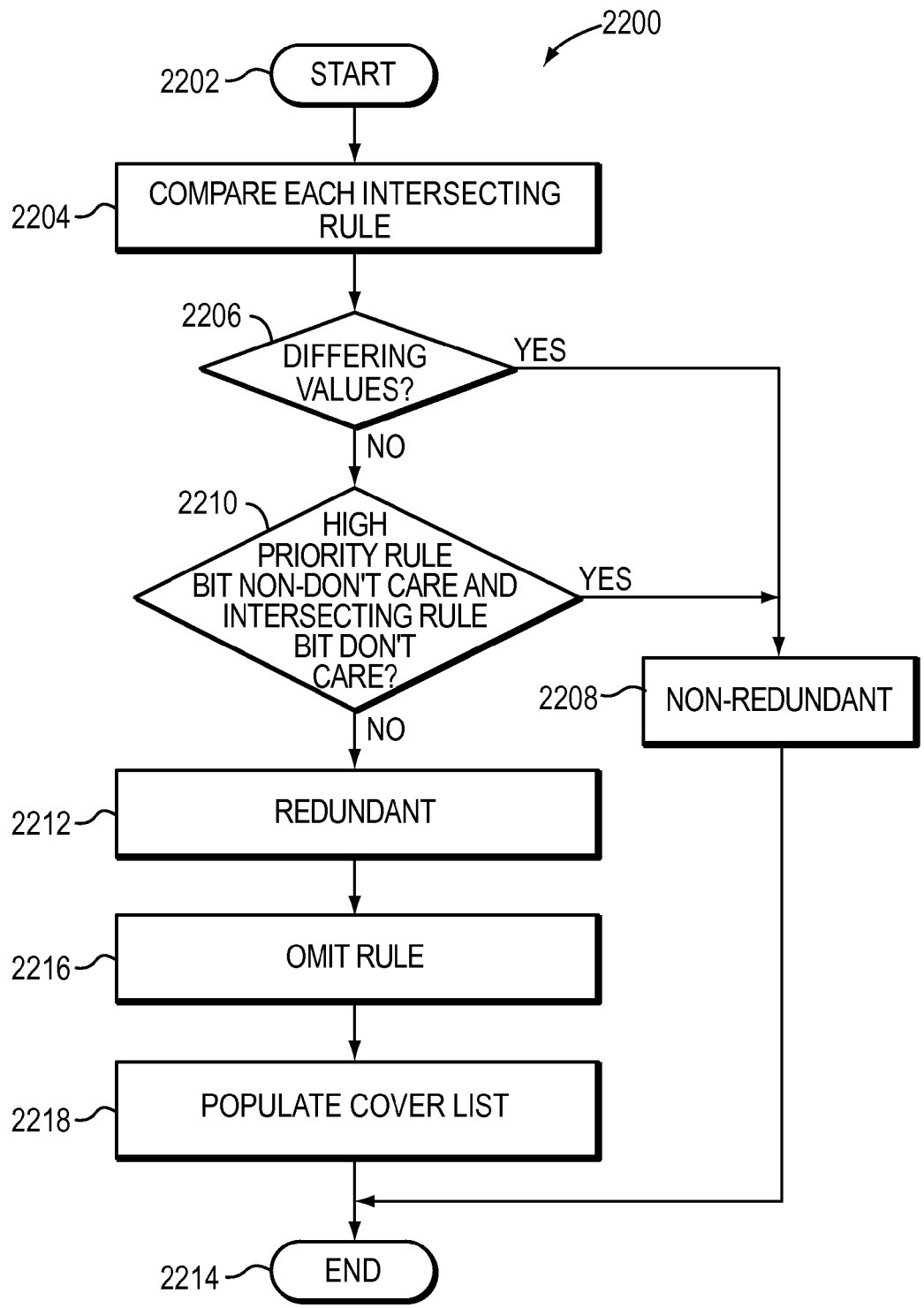
FIG. 22 is flow diagram of an example embodiment of a method for determining a redundancy status for each intersecting rule in a determined set of intersecting rules for a child node.
Figure 23:
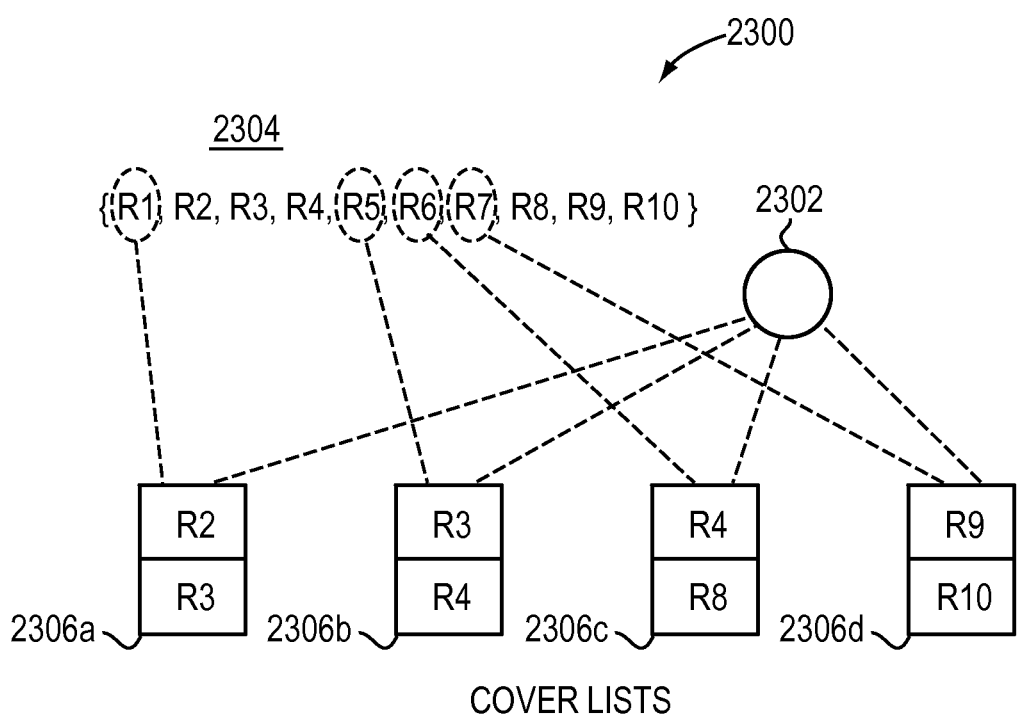
FIG. 23 is a block diagram of an embodiment of cover lists for rules of a node.

FIG. 22 is flow diagram of an example embodiment of a method for determining a redundancy status for each intersecting rule in a determined set of intersecting rules for a child node (2200). The method may begin (2202) and compare each intersecting rule with each rule of higher priority in the determined set using a bit-by-bit basis comparison of each at least one field for each pair of rules compared. The method may check if the intersecting rule and the rule of higher priority have differing values for a corresponding bit (2206), the redundancy status for the intersecting rule may be set to non-redundant (2208) and the method thereafter ends (2214) in the example embodiment. If the rule of higher priority has a non-don't-care value for a particular bit and the intersecting rule has a don't-care value for the particular bit, the redundancy status for the intersecting rule may be non-redundant (2208) and the method thereafter ends (2214) in the example embodiment. If at (2210) the check is no, the redundancy status for the intersecting rule may be redundant (2212) and the rule of higher priority may be identified as a covering rule for the intersecting rule. The method may omit the intersecting rule having the redundant redundancy status (2216) and populate a cover list associated with the child node and the covering rule identified for the intersecting rule omitted (2218) and the method thereafter ends (2214) in the example embodiment FIG. 23 is a block diagram 2300 of an embodiment of cover lists for rules of a node 2302. The node 2302 has a set of ten rules 2304, such as R1-R10, and four cover lists 2306a-d in the example embodiment. Out of the ten rules 2304, four of the rules are higher priority, such as R1, R5, R6, and R7 that cover the remaining rules R2, R3, R4, R8, R9, and R10 as follows. R1 covers R2 and R3, R5 covers R3 and R4, R6 covers R4 and R8, and R7 covers R9 and R10. As such, a cover list 2306a for the node 2302 associated with R1 includes R2 and R3, a cover list 2306b for the node 2302 associated with R5 includes R3 and R4, a cover list 2306c for the node 2302 associated with R6 includes R4 and R8, and a cover list 2306d for the node 2302 associated with R7 includes R9 and R10. According to embodiments disclosed herein, a compiler of a decision tree data structure may be made more efficient by avoiding compiler operations that may be unproductive and time consuming. An example of a time consuming operation is a search for redundant rules. A redundant rule may also be referred to herein as a covered rule.

According to another embodiment, a walker may search for a key in a tree that includes stride nodes, mask nodes, or a combination thereof. As a search arrives at a node, the walker may determine the child node to be searched next. If the search arrives at a stride node, the walker may update a marker based on a stride value of the node. The stride value may indicate bits used for cutting the node. A node may store a stride value for each field cut. Storing stride values enables a walker to figure out a marker and build a cutting context. Alternatively, a marker may be stored at each node of a stride node to provide cutting context to the walker such that the walker does not build the context dynamically. For stride nodes, the walker may use the stride value to update a marker in order to determine a reference bit for extracting a contiguous number of n-bits from the key. The walker may use the extracted bits n-bits to form an index to a next child node to search.

According to embodiments disclosed herein, each mask node of the tree may include a bitmap for each at least one field. The bitmap may indicate one or more bits that the at least one field was cut on. When a search arrives at a mask node, the corresponding bits (e.g., bits used to cut the at least one field) in the key may be extracted and concatenated to form an n-bit number. The n-bit number may be used as an index for determining the child node to be searched next. According to embodiments disclosed herein, the extracted bits may be arbitrary key bits that are contiguous or non-contiguous. For example, in the example embodiment described above, the compiler selects the don't care bits of the bitstring 1xx0x in the bit 0 and bit 3 positions. As such, two bits were selected at the node for cutting, the corresponding two bits in the key would be used to form an index from 0 to 3.

According to embodiments disclosed herein, the tree may include stride nodes, mask nodes, or a combination thereof. As the tree is built, each node, whether mask node or stride node, may specify values for some of the key bits, different for each child. The child nodes, and their descendants, cannot cut on bits that have already been given a value (e.g., consumed) by an ancestor node. This is true of both stride and mask nodes. Stride and mask nodes may be freely intermixed in the tree, subject to this constraint. According to one embodiment, if a stride node is created as the child of a mask node, the first bit cut by the stride node is the bit following the last (least significant) bit cut by the mask node.

Figure 24:
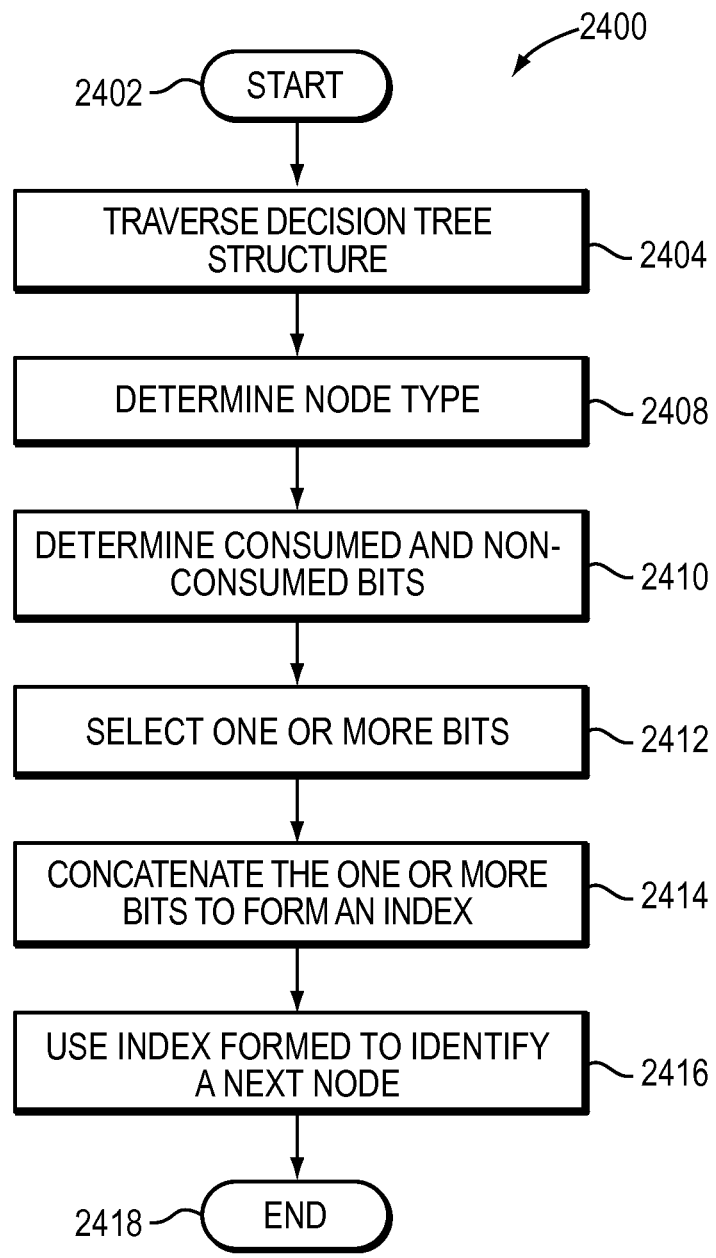
FIG. 24 is a flow diagram of an example embodiment of a method for walking a decision tree structure.

FIG. 24 is a flow diagram of an example embodiment of a method for walking a decision tree structure (2400). The method may begin (2402) and traverse the decision tree structure for a key (2404). The decision tree structure may include a plurality of nodes having a plurality of rules representing a search space. The plurality of rules may have at least one field, each node representing a subset of the search space. For each node reached during the traversing, the method may determine a type for the node reached, the type for the node reached may be a stride node type or a mask node type (2408). The method may determine consumed and non-consumed bits of the key, the consumed bits of the key being bits used for search space division of nodes traversed to reach the node reached (2410). The method may select one or more bits from the non-consumed bits of the key based on the node type and the consumed bit indicator (e.g., stride value or mask stored in the node) for the node reached (2412). The method may concatenate the one or more bits selected to form an index (2414), and use the index formed to identify a next node for the traversing (2416) and the method thereafter ends (2418) in the example embodiment. As described above, walking the decision tree may continue in order to reach a leaf node and perform a linear search of rules within the leaf node reached to find a matching rule.

Figure 25:
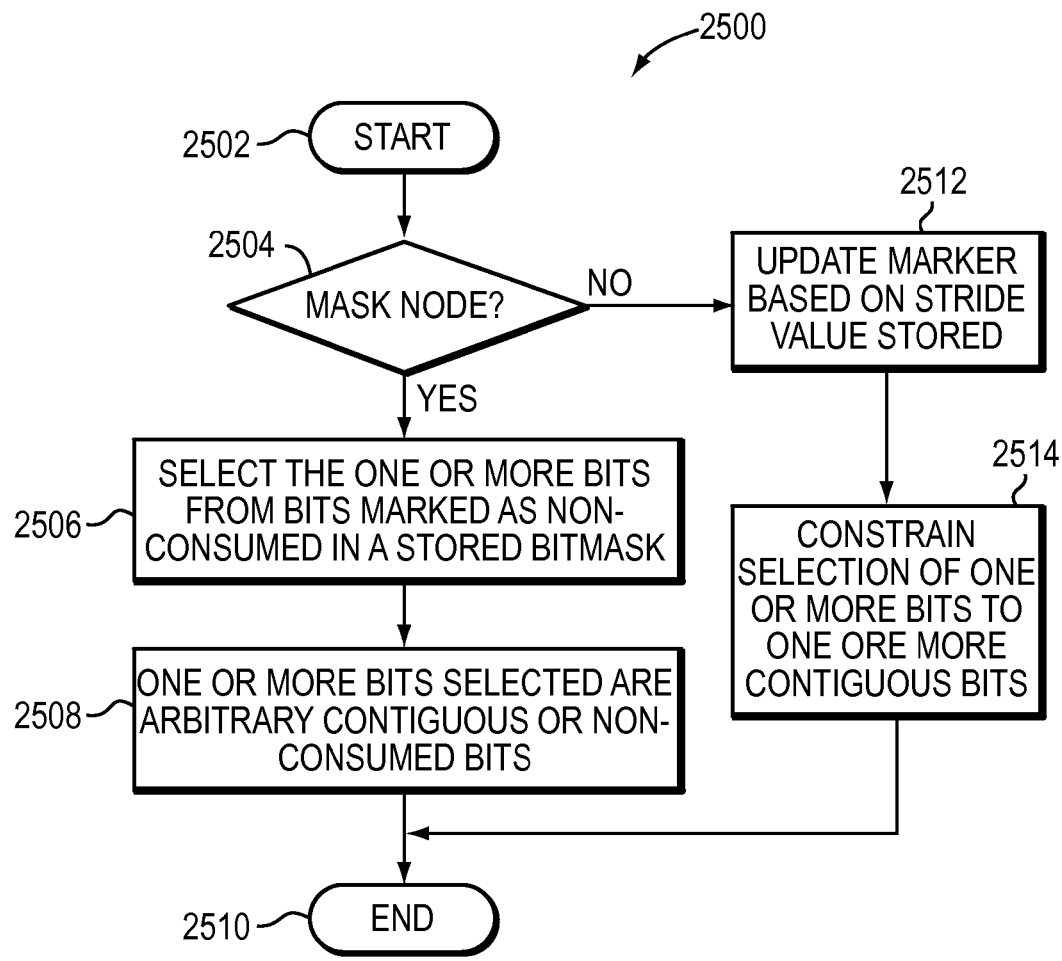
FIG. 25 is a flow diagram of another example embodiment of a method for walking a decision tree structure.

FIG. 25 is a flow diagram of another example embodiment of a method for walking a decision tree structure (2500). The method may begin (2502) and check if the node type is the mask node type (2504). If yes, the method may include storing a bitmask for each at least one field of rules represented by the node and may select the one or more bits from bits marked as non-consumed in the bitmask stored (2506). The one or more bits selected are arbitrary contiguous or non-contiguous non-consumed bits of the key (2508) and the method thereafter ends (2510) in the example embodiment.

If the check for the mask node type (2504) is no, the node type is the stride node type. The method may store a stride value for each at least one field of each rule of the node and update a marker for each at least one field of each rule of the node based on the stride value stored for each at least one field of each rule of the node (2512). The method may further include identifying a least significant consumed bit of the key based on the marker updated and constraining selection of the one or more bits to one or more contiguous bits adjacent to and of lesser significance than the least significant consumed bit identified (2514) and the method thereafter ends (2510) in the example embodiment.

It should be understood that the block, flow, network diagrams may include more or fewer elements, be arranged differently, or be represented differently. It should be understood that implementation may dictate the block, flow, network diagrams and the number of block, flow, network diagrams illustrating the execution of embodiments described herein.

It should be understood that elements of the block, flow, network diagrams described above may be implemented in software, hardware, or firmware. In addition, the elements of the block, flow, network diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and other non-transitory forms of computer readable medium. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   building a decision tree structure including a plurality of nodes using a classifier table having a plurality of rules representing a search space, the plurality of rules having at least one field, each node representing a subset of the search space;
   building the decision tree structure including, at each node, (a) dividing the subset of the search space represented by the node into smaller subsets by (i) determining a node type for the node, the node type determination enabling a combination of node types in the decision tree structure, (ii) selecting one or more fields of the at least one field and selecting one or more bits of the selected one or more fields based on the node type determined for the node, a node type of a parent node of the node, and a consumed bit indicator for the node, the consumed bit indicator specifying all bits consumed for search space division by each ancestor of the node, and (iii) cutting the node into child nodes on the selected one or more bits to create the smaller subsets and allocating the created smaller subsets to the child nodes;
   (b) updating the consumed bit indicator to specify the selected one or more bits as utilized and associating the updated consumed bit indicator with each of the child nodes; and
   storing the built decision tree structure.

2. The method of claim 1 wherein determining the node type for the node includes selecting the node type from a set of node types including at least a mask node type and a stride node type.

3. The method of claim 2 wherein selecting the one or more bits of the selected one or more fields includes:
   given the selected mask node type, enabling an arbitrary contiguous or non-contiguous selection of the one or more bits from a set of bits including all non-consumed bits for search space subdivision by each ancestor of the node; and
   given the selected stride node type, constraining selection of the one or more bits to one or more contiguous non-consumed bits adjacent to and of lesser significance than a least significant consumed bit specified by the consumed bit indicator.

4. The method of claim 2 wherein the consumed bit indicator for the selected mask node type is a bit mask representing a consumed state for each bit in the selected one or more fields and further wherein the consumed bit indicator for the selected stride node type includes a bit location marker indicating a bit location of a most significant non-consumed bit.

5. The method of claim 2 wherein the built decision tree structure includes at least one node with the selected mask node type or at least one node with the selected stride node type or a combination thereof.

6. The method of claim 2 wherein in an event the stride node type is selected and the node type of the parent node is the mask node type, cutting the node into child nodes on the selected one or more bits includes selecting a first bit of the selected one or more bits, the first bit used to cut being adjacent to and of lesser significance than a least significant bit used to cut the parent node of the node.

7. The method of claim 1 wherein cutting the node into child nodes on the selected one or more bits includes:
for each child node, creating a node description for the child node based on the selected one or more bits, wherein the node description is a mask represented as a bitstring including ones, zeroes, or don't care bits, or a combination thereof, in arbitrary bit locations of the mask and the mask is a one-dimensional or multi-dimensional mask; and
computing on a bit-by-bit basis an intersection between the node description for the child node and rules represented by the node to determine a set of intersecting rules and assigning the set of intersecting rules determined to the child.

8. The method of claim 7 wherein computing on the bit-by-bit basis the intersection of all rules belonging to the node with the node description of the child node includes applying on the bit-by-bit basis a set of intersection rules including: a don't-care bit intersected with another don't-care bit yields the don't-care bit, a value intersected with an equal value yields the value, the don't-care bit intersected with the value yields the value, and the value intersected with an unequal value yields an empty intersection, and further wherein a given rule of the node intersects the child node if the computed intersection for the given rule with a rule of the child node is non-empty.

9. The method of claim 7 further including for each child node, determining a redundancy status for each intersecting rule in the determined set of intersecting rules for the child node.

10. The method of claim 9 wherein determining the redundancy status for each intersecting rule for each child node includes comparing each intersecting rule with each rule of higher priority in the determined set using a bit-by-bit basis comparison for each pair of rules compared, wherein (iv) if the intersecting rule and the rule of higher priority have differing values for a corresponding bit, the redundancy status for the intersecting rule is non-redundant, (v) if the rule of higher priority has a non-don't-care value for a particular bit and the intersecting rule has a don't-care value for the particular bit, the redundancy status for the intersecting rule is non-redundant, and (vi) if neither (iv) nor (v) apply at any bit, the redundancy status for the intersecting rule is redundant and the rule of higher priority is identified as a covering rule for the intersecting rule, the method further including:
for each child node, omitting each intersecting rule having the redundant redundancy status and populating a cover list associated with the child node and the covering rule identified for the omitted intersecting rule.

11. An apparatus comprising:
a memory;
a processor coupled to the memory, the processor configured to build a decision tree structure including a plurality of nodes using a classifier table having a plurality of rules representing a search space, the plurality of rules having at least one field, each node representing a subset of the search space;
to build the decision tree structure, the processor further configured to, at each node, (a) divide the subset of the search space represented by the node into smaller subsets by (i) determining a node type for the node, the node type determination enabling a combination of node types in the decision tree structure, (ii) selecting one or more fields of the at least one field and selecting one or more bits of the selected one or more fields based on the node type determined for the node, a node type of a parent node of the node, and a consumed bit indicator for the node, the consumed bit indicator specifying all bits consumed for search space division by each ancestor of the node, and (iii) cutting the node into child nodes on the selected one or more bits to create the smaller subsets and allocating the created smaller subsets to the child nodes;
(b) update the consumed bit indicator to specify the selected one or more bits as utilized and associating the updated consumed bit indicator with each of the child nodes; and
store the built decision tree structure in the memory.

12. The apparatus of claim 11 wherein to determine the node type for the node, the processor is further configured to select the node type from a set of node types including at least a mask node type and a stride node type.

13. The apparatus of claim 12 wherein to select the one or more bits of the selected one or more fields, the processor is further configured to:
given the selected mask node type, enable an arbitrary contiguous or non-contiguous selection of the one or more bits from a set of bits including all non-consumed bits for search space subdivision by each ancestor of the node; and
given the selected stride node type, constrain selection of the one or more bits to one or more contiguous non-consumed bits adjacent to and of lesser significance than a least significant consumed bit specified by the consumed bit indicator.

14. The apparatus of claim 12 wherein the consumed bit indicator for the selected mask node type is a bit mask representing a consumed state for each bit in the selected one or more fields and further wherein the consumed bit indicator for the selected stride node type includes a bit location marker indicating a bit location of a most significant non-consumed bit.

15. The apparatus of claim 12 wherein the built decision tree structure includes at least one node with the selected mask node type or at least one node with the selected stride node type or a combination thereof.

16. The apparatus of claim 12 wherein in an event the stride node type is selected and the node type of the parent node is the mask node type, the processor is further configured to cut the node into child nodes on the selected one or more bits and select a first bit of the selected one or more bits, the first bit used to cut being adjacent to and of lesser significance than a least significant bit used to cut the parent node of the node.

17. The apparatus of claim 11 wherein to cut the node into child nodes on the selected one or more bits the processor is further configured to:
   for each child node, create a node description for the child node based on the selected one or more bits, wherein the node description is a mask represented as a bitstring including ones, zeroes, or don't care bits, or a combination thereof, in arbitrary bit locations of the mask and the mask is a one-dimensional or multi-dimensional mask; and
   compute on a bit-by-bit basis an intersection between the node description for the child node and rules represented by the node to determine a set of intersecting rules and assign the set of intersecting rules determined to the child.

18. The apparatus of claim 17 wherein to compute the intersection of all rules belonging to the node with the node description of the child node on the bit-by-bit basis, the processor is further configured to apply a set of intersection rules including: a don't-care bit intersected with another don't-care bit yields the don't-care bit, a value intersected with an equal value yields the value, the don't-care bit intersected with the value yields the value, and the value intersected with an unequal value yields an empty intersection, and further wherein a given rule of the node intersects the child node if the computed intersection for the given rule with a rule of the child node is non-empty.

19. The apparatus of claim 17 wherein the processor is further configured to for each child node, determine a redundancy status for each intersecting rule in the determined set of intersecting rules for the child node.

20. The apparatus of claim 19 wherein to determine the redundancy status for each intersecting rule for each child node, the processor is further configured to compare each intersecting rule with each rule of higher priority in the determined set using a bit-by-bit basis comparison for each pair of rules compared, wherein (iv) if the intersecting rule and the rule of higher priority have differing values for a corresponding bit, the redundancy status for a lower priority rule of the compared pair of rules is non-redundant, (v) if the rule of higher priority has a non-don't-care value for a particular bit and the intersecting rule has a don't-care value for the particular bit, the redundancy status for the intersecting rule is non-redundant, and (vi) if neither (iv) nor (v) apply at any bit, the redundancy status for the intersecting rule is redundant and the rule of higher priority is identified as a covering rule for the intersecting rule, the processor further configured to:
   for each child node, omit each intersecting rule having the redundant redundancy status and populate a cover list associated with the child node and the covering rule identified for the omitted intersecting rule.

21. A non-transitory computer-readable medium having encoded thereon a sequence of instructions which, when loaded and executed by a processor, causes the processor to:
   build a decision tree structure including a plurality of nodes using a classifier table having a plurality of rules representing a search space, the plurality of rules having at least one field, each node representing a subset of the search space;
   build the decision tree structure, the sequence of instructions further causing the processor to, at each node, (a) divide the subset of the search space represented by the node into smaller subsets by (i) determining a node type for the node, the node type determination enabling a combination of node types in the decision tree structure, (ii) selecting one or more fields of the at least one field and selecting one or more bits of the selected one or more fields based on the node type determined for the node, a node type of a parent node of the node, and a consumed bit indicator for the node, the consumed bit indicator specifying all bits consumed for search space division by each ancestor of the node, and (iii) cutting the node into child nodes on the selected one or more bits to create the smaller subsets and allocating the created smaller subsets to the child nodes;
   (b) update the consumed bit indicator to specify the selected one or more bits as utilized and associating the updated consumed bit indicator with each of the child nodes; and
   store the built decision tree structure in a memory.

22. The non-transitory computer-readable medium of claim 21 wherein to determine the node type for the node, the sequence of instructions further causes the processor to select the node type from a set of node types including at least a mask node type and a stride node type.

23. The non-transitory computer-readable medium of claim 22 wherein the sequence of instructions further causes the processor to:
   given the selected mask node type, enable an arbitrary contiguous or non-contiguous selection of the one or more bits from a set of bits including all non-consumed bits for search space subdivision by each ancestor of the node; and
   given the selected stride node type, constrain selection of the one or more bits to one or more contiguous non-consumed bits adjacent to and of lesser significance than a least significant consumed bit specified by the consumed bit indicator.

24. The non-transitory computer-readable medium of claim 22 wherein the consumed bit indicator for the selected mask node type is a bit mask representing a consumed state for each bit in the selected one or more fields and further wherein the consumed bit indicator for the selected stride node type includes a bit location marker indicating a bit location of a most significant non-consumed bit.

25. The non-transitory computer-readable medium of claim 22 wherein the built decision tree structure includes at least one node with the selected mask node type or at least one node with the selected stride node type or a combination thereof.

26. The non-transitory computer-readable medium of claim 22 wherein in an event the stride node type is selected and the node type of the parent node is the mask node type, the sequence of instructions further causes the processor to cut the node into child nodes on the selected one or more bits and select a first bit of the selected one or more bits, the first bit used to cut being adjacent to and of lesser significance than a least significant bit used to cut the parent node of the node.

27. The non-transitory computer-readable medium of claim 21 wherein to cut the node into child nodes on the selected one or more bits, the sequence of instructions further causes the processor to:
   for each child node, create a node description for the child node based on the selected one or more bits, wherein the node description is a mask represented as a bitstring including ones, zeroes, or don't care bits, or a combination thereof, in arbitrary bit locations of the mask and the mask is a one-dimensional or multi-dimensional mask; and compute on a bit-by-bit basis an intersection between the node description for the child node and rules represented by the node to determine a set of intersecting rules and assign the set of intersecting rules determined to the child.

28. The non-transitory computer-readable medium of claim 27 wherein to compute the intersection of all rules belonging to the node with the node description of the child node on the bit-by-bit basis, the sequence of instructions further causes the processor to apply a set of intersection rules including: a don't-care bit intersected with another don't-care bit yields the don't-care bit, a value intersected with an equal value yields the value, the don't-care bit intersected with the value yields the value, and the value intersected with an unequal value yields an empty intersection, and further wherein a given rule of the node intersects the child node if the computed intersection for the given rule with a rule of the child node is non-empty.

29. The non-transitory computer-readable medium of claim 27 wherein the sequence of instructions further causes the processor to for each child node, determine a redundancy status for each intersecting rule in the determined set of intersecting rules for the child node.

30. The non-transitory computer-readable medium of claim 29 wherein to determine the redundancy status for each intersecting rule, the sequence of instructions further causes the processor to compare each intersecting rule with each rule of higher priority in the determined set using a bit-by-bit basis comparison for each pair of rules compared, wherein (iv) if the intersecting rule and the rule of higher priority have differing values for a corresponding bit, the redundancy status for the intersecting rule is non-redundant, (v) if the rule of higher priority has a non-don't-care value for a particular bit and the intersecting rule has a don't-care value for the particular bit, the redundancy status for the intersecting rule is non-redundant, and (vi) if neither (iv) nor (ii) (v) apply at any bit, the redundancy status for the intersecting rule is redundant and the rule of higher priority is identified as a covering rule for the intersecting rule, wherein the sequence of instructions still further causes the processor to:

for each child node, omit each intersecting rule having the redundant redundancy status and populate a cover list associated with the child node and the covering rule identified for the omitted intersecting rule.

* * * * *